US011851341B2

(12) United States Patent
Pala et al.

(10) Patent No.: US 11,851,341 B2
(45) Date of Patent: Dec. 26, 2023

(54) HIGH PURITY SYNTHETIC FLUORITE, PROCESS FOR PREPARING THE SAME AND APPARATUS THEREFOR

(71) Applicant: FLUORSID S.P.A., Assemini (IT)

(72) Inventors: Luca Pala, Quartu Sant'elena (IT); Michele Lavanga, Cagliari (IT)

(73) Assignee: FLUORSID S.P.A., Assemini (IT)

( * ) Notice: Subject to any disclaimer, the term of this patent is extended or adjusted under 35 U.S.C. 154(b) by 0 days.

(21) Appl. No.: 15/562,849

(22) PCT Filed: Mar. 31, 2016

(86) PCT No.: PCT/IB2016/000409
§ 371 (c)(1),
(2) Date: Sep. 28, 2017

(87) PCT Pub. No.: WO2016/156969
PCT Pub. Date: Oct. 6, 2016

(65) Prior Publication Data
US 2018/0105433 A1 Apr. 19, 2018

(30) Foreign Application Priority Data

Apr. 2, 2015 (IT) .................. 102015902342300

(51) Int. Cl.
*C01F 11/22* (2006.01)
*C01C 1/16* (2006.01)
(Continued)

(52) U.S. Cl.
CPC .......... *C01F 11/22* (2013.01); *B01J 19/0066* (2013.01); *B01J 19/06* (2013.01); *B01J 19/1862* (2013.01);
(Continued)

(58) Field of Classification Search
CPC .......... C01B 33/186; C01C 1/162; C01F 11/22
See application file for complete search history.

(56) References Cited

U.S. PATENT DOCUMENTS 3,684,435 A 8/1972 Lapomaa et al.
3,923,964 A * 12/1975 Kidde .................... C01F 11/22
423/490
(Continued)

FOREIGN PATENT DOCUMENTS

CN 101863482 A 10/2010
CN 102502753 A 6/2012
(Continued)

OTHER PUBLICATIONS

Hubertus Slangen, "Simultaneous Granulation and Drying of Filter Cake", Chem. Eng. Techno. 25, 2002, 12, pp. 1193-1196 (Year: 2002).*
(Continued)

*Primary Examiner* — Anita Nassiri-Motlagh
(74) *Attorney, Agent, or Firm* — Pearne & Gordon LLP

(57) ABSTRACT

The present invention relates to a high purity synthetic fluorite ($CaF_2$). The present invention further relates to a process and an apparatus for preparing said high purity synthetic fluorite ($CaF_2$), classified as acid grade, starting from fluorosilicic acid $H_2SiF_6$ (FSA) and calcium carbonate ($CaCO_3$). Finally, the present invention relates to the use of said high purity synthetic fluorite ($CaF_2$) in the industrial production of hydrofluoric acid.

16 Claims, 7 Drawing Sheets

(51) Int. Cl.
*C01B 33/18* (2006.01)
*B01J 19/06* (2006.01)
*C01B 7/19* (2006.01)
*B01J 19/00* (2006.01)
*B01J 19/18* (2006.01)

(52) U.S. Cl.
CPC ............ *C01B 7/191* (2013.01); *C01B 33/186* (2013.01); *C01C 1/162* (2013.01); *C01P 2004/51* (2013.01); *C01P 2004/60* (2013.01); *C01P 2006/12* (2013.01); *C01P 2006/32* (2013.01); *C01P 2006/80* (2013.01); *C01P 2006/82* (2013.01)

(56) References Cited

U.S. PATENT DOCUMENTS

| | | | | |
|---|---|---|---|---|
| 3,976,447 | A | * | 8/1976 | Merchant ............... B01D 53/02 95/131 |
| 4,051,213 | A | * | 9/1977 | Kooy ........................ B01J 2/28 264/109 |
| 4,093,706 | A | * | 6/1978 | Augustyn ............... C01F 11/22 423/335 |
| 4,157,377 | A | * | 6/1979 | Evans ................... C01B 35/063 423/276 |
| 4,200,622 | A | * | 4/1980 | Kyri ........................ C01C 1/162 423/143 |
| 4,662,937 | A | * | 5/1987 | Katayama ............. C22C 33/003 420/434 |
| 4,915,705 | A | | 4/1990 | Mollere et al. |
| 2008/0123086 | A1 | * | 5/2008 | Kudo ................... G02B 13/143 356/124 |

FOREIGN PATENT DOCUMENTS

| | | |
|---|---|---|
| CN | 102976356 A | 3/2013 |
| CN | 103073040 A | 5/2013 |
| CN | 105906111 A | 8/2016 |
| RU | 2010003 C1 | 3/1994 |
| RU | 2388694 C2 | 5/2010 |
| RU | 2465206 C1 | 10/2012 |

OTHER PUBLICATIONS

Aigueperse, J., et al., "Fluorine Compounds, Inorganic", Ullmann'S Encyclopedia of Industrial Chemistry, Jun. 15, 2000, Wiley-VCH Verlag GmbH & Co. KgaA, Weinheim, Germany, XP055054753, pp. 398-441.

* cited by examiner

HIGH PURITY SYNTHETIC FLUORITE, PROCESS FOR PREPARING THE SAME AND APPARATUS THEREFOR

The present invention relates to a high purity synthetic fluorite ($CaF_2$). Furthermore, the present invention relates to a process for the preparation of said high purity synthetic fluorite ($CaF_2$), classified as acid grade, starting from fluorosilicic acid $H_2SiF_6$ (FSA). In addition, the present invention relates to the use of said high purity synthetic fluorite ($CaF_2$) in the industrial production of hydrofluoric acid. Finally, the present invention relates to an apparatus for the production of said synthetic fluorite.

Fluorosilicic acid $H_2SiF_6$ (FSA) is a by-product of the industrial production of phosphoric acid, obtained by absorption in water of silicon tetrafluoride ($SiF_4$) generated by the reaction between silica and fluorine, which are present in the phosphate mineral used as a raw material, and sulphuric acid used for the production of phosphoric acid.

During the step of phosphoric acid concentration, $SiF_4$ can be absorbed into an aqueous solution, producing FSA with a concentration varying between 23% and 35%.

The known methods for preparing synthetic fluorite are limited, at times, to the synthesis of fluorite in wet form with a particle size of 5 microns and not always optimal purity. These types of synthetic fluorite cannot be used for the purpose of producing hydrofluoric acid HF.

Unfortunately, available known methods for the preparation of synthetic fluorite are not able to eliminate the presence of contaminating substances or compounds or impurities such as silica $SiO_2$ and/or aluminium ($Al_2O_3$), magnesium (MgO), iron ($Fe_2O_3$) and sodium ($Na_2O$) oxides, which are also present in natural acid grade fluorite $CaF_2$ in a variable amount. In the case of silica $SiO_2$, for example, natural fluorite $CaF_2$ can contain a variable amount of between 0.5% and 1.5% by weight. Silica, present as an impurity in fluorite used as a raw material, is well known to have a negative impact on the HF formation process according to the following reaction:

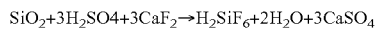

$$SiO_2 + 3H_2SO_4 + 3CaF_2 \rightarrow H_2SiF_6 + 2H_2O + 3CaSO_4$$

Fluorite loss can be calculated stoichiometrically and is about 3.9% per 1% of $SiO_2$ and sulphuric acid loss is about 4.9% per 1% of $SiO_2$. In the absence of silica, the reaction of HF formation from synthetic fluorite is:

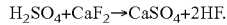

$$H_2SO_4 + CaF_2 \rightarrow CaSO_4 + 2HF.$$

The presence of magnesium, for example as magnesium oxide, in fluorite causes some problems during the reaction with sulphuric acid. The gypsum $CaSO_4$ produced in the presence of magnesium tends to form scale on the walls of furnaces for producing HF. This effect can lead to a complete interruption of the reaction, thus resulting in an unwanted plant downtime or in any case a large increase in specific fluorite consumption (the amount of fluorite lost in the gypsum increases).

Therefore, from an economic and processing standpoint, it is necessary to be able to reduce the amount of magnesium (expressed as magnesium oxide) present in the fluorite to an amount below 0.5% at least.

Hence, there remains a need to have a high purity synthetic fluorite which is substantially free of contaminating substances or compounds or impurities such as, for example, silica $SiO_2$ (in an amount of less than 1% by weight) and/or aluminium ($Al_2O_3$) and/or magnesium (MgO) metal oxides (in an amount of less than 0.5% by weight) and/or iron ($Fe_2O_3$) and/or sodium ($Na_2O$) metal oxides, so as to validly enable the use of said synthetic fluorite in a process for the production of hydrofluoric acid.

Moreover, there remains a need to have a process and an apparatus for the production of synthetic fluorite which is simple, efficient and has high yields and which, starting from fluorosilicic acid, is therefore capable of providing a synthetic fluorite with a high purity and without contaminating substances or compounds or impurities such as, for example, silica $SiO_2$ and/or aluminium ($Al_2O_3$) and/or magnesium (MgO) and/or iron ($Fe_2O_3$) and/or sodium ($Na_2O$) metal oxides. Said synthetic fluorite can be validly used in a process for the production of hydrofluoric acid.

The present invention relates to a high purity synthetic fluorite ($CaF_2$), classified as "acid grade", having the characteristics as defined in the appended claims. Said $CaF_2$ is produced in granules with an average particle size greater than 1 mm for at least 50% by weight of the same, with granules that show good mechanical stability and a large specific surface area (BET). Said particle size imparts marked properties of reactivity to the synthetic $CaF_2$, making it competitive as a replacement for acid grade natural fluorite in the production of HF.

The present invention relates to a process and an apparatus for preparing said high purity synthetic fluorite ($CaF_2$), classified as "acid grade", having the characteristics as defined in the appended claims.

The present invention relates to the use of said high purity synthetic fluorite ($CaF_2$), classified as "acid grade", in the industrial production of hydrofluoric acid (HF), having the characteristics as defined in the appended claims.

DETAILED DESCRIPTION

Preferred embodiments of the present invention will be illustrated in the detailed description that follows below.

Figure 1:
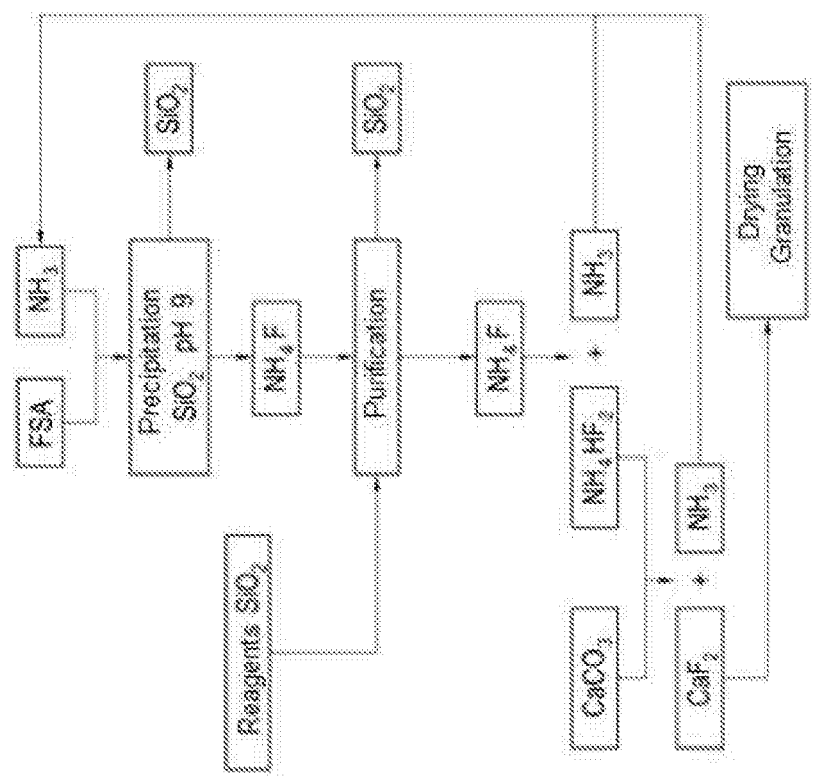
FIG. 1 is a block diagram of the process for preparing high purity synthetic fluorite, according to an embodiment of the present invention comprising the purification of a solution of $NH_4F$, the transformation of $NH_4F$ into ammonium bifluoride ($NH_4HF_2$) and the use of $CaCO_3$.

FIG. 1 represents a block diagram of the process for preparing high purity synthetic fluorite, according to an embodiment of the present invention comprising the purification of a solution of $NH_4F$, the transformation of $NH_4F$ into ammonium bifluoride ($NH_4HF_2$) and the use of $CaCO_3$.

Figure 2:
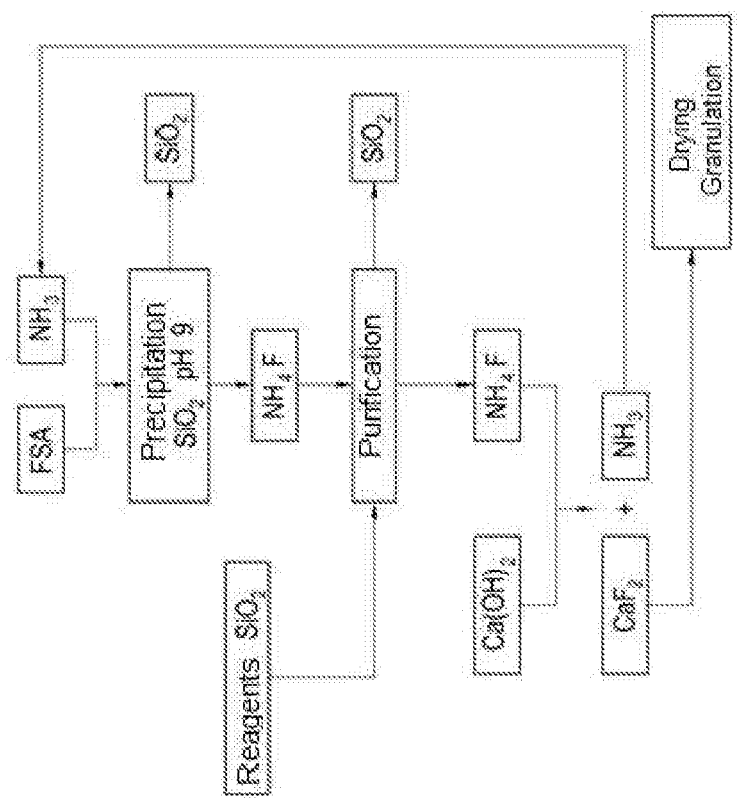
FIG. 2 is a block diagram of the process for preparing high purity synthetic fluorite, according to an embodiment of the present invention comprising the purification of a solution of $NH_4F$ and the use of $Ca(OH)_2$.

FIG. 2 represents a block diagram of the process for preparing high purity synthetic fluorite, according to an embodiment of the present invention comprising the purification of a solution of $NH_4F$ and the use of $Ca(OH)_2$. In the context of the present invention, "high purity" synthetic fluorite ($CaF_2$) means a synthetic fluorite having a concentration equal to or greater than 95% by weight relative to the dry weight; preferably equal to or greater than 97% by weight relative to the dry weight; preferably equal to or greater than 99% by weight relative to the dry weight.

In the context of the present invention, high purity synthetic fluorite (CaF2), classified as "acid grade", means a fluorite having a $CaF_2$ content greater than 95% by weight, for example greater than 97% by weight, relative to the dry weight, as measured according to current techniques and based on the knowledge that: 1) fluorite at 100° C., pressure of 1 atmosphere, after 60 minutes, has a water content of about 4%, by weight; and that 2) fluorite at 800° C., pressure of 1 atmosphere, after 80 minutes, has a water content of about 0%, by weight.

In a first embodiment R1, the process according to the present invention is represented, by way of example, without limiting, therefore, the scope of the present invention, in the block diagram of FIG. 1 (simplified block diagram of the main steps of the process according to the present invention, which comprises the purification of the solution of $NH_4F$, the transformation of $NH_4F$ into ammonium bifluoride ($NH_4HF_2$) and the use of $CaCO_3$).

In summary, said first embodiment R1 (FIG. 1 and FIG. 5) comprises the following steps:

1) Decomposition of fluorosilicic acid (FSA) $H_2SiF_6$ FSA with ammonia and separation of the silica precipitated from the solution of ammonium fluoride $NH_4F$ (R1F1)

2) Purification of the solution of $NH_4F$ by dosing suitable reagents which enable the elimination, by precipitation and subsequent separation, of the silica still present in the solution of $NH_4F$ (R1F2).

3) Transformation of $NH_4F$ into ammonium bifluoride $NH_4HF_2$ by distillation under reduced pressure (according to reaction B, see below) and consequent recovery of a fraction of $NH_3$ by absorption in an aqueous solution or condensation (R1F3).

4) Synthesis and precipitation of the synthetic fluorite $CaF_2$ thus obtained by reaction of calcium carbonate or calcium hydroxide $Ca(OH)_2$ with $NH_4HF_2$ and simultaneous distillation of free ammonia so as to recover the remaining fraction of $NH_3$ by absorption in an aqueous solution or condensation (R1F4).

In a second embodiment R2, the process according to the present invention is represented, by way of example, without limiting, therefore, the scope of the present invention, in the block diagram of FIG. 2 (simplified block diagram of the main steps of the process of the present invention, which comprises the purification of the solution of $NH_4F$ and the use of $Ca(OH)_2$).

In summary, said second embodiment R2 (FIG. 2 and FIG. 6) comprises the following steps:

1) Decomposition of fluorosilicic acid (FSA) $H_2SiF_6$ FSA with ammonia and separation of the silica precipitated from the solution of ammonium fluoride $NH_4F$ (R2F1).

2) Purification of the solution of $NH_4F$ by dosing suitable reagents which enable the elimination, by precipitation and subsequent separation, of the silica still present in the solution of $NH_4F$ (R2F2).

3) Synthesis and precipitation of the synthetic fluorite $CaF_2$ starting directly from $NH_4F$ in the presence of calcium hydroxide $Ca(OH)_2$ or calcium carbonate (R2F3).

The process according to the present invention (in each of the embodiments thereof) makes it possible to obtain a synthetic fluorite having a qualitative/quantitative composition as disclosed below.

In one embodiment, the composition of the synthetic fluorite, after drying at 110° C. until a constant weight is obtained, is the following:
$CaF_2$=95-96%
$CaCO_3$ (or $Ca(OH)_2$)=0.7-1.2%
$SiO_2$=0.01-0.2%
$MgO$=0.05-0.2%
$Al_2O_3$=0.05-0.2%
LOI ($H_2O$–loss on ignition)=4-5%

In another embodiment, the composition of the above synthetic fluorite, once dried after calcination at 800° C. for 30 minutes, is the following:
$CaF_2$=98-99%
$CaCO_3$ (or $Ca(OH)_2$)=0.7-1.3%
$SiO_2$=0.01-0.2%
$MgO$=0.05-0.2%
$Al_2O_3$=0.05-0.2%
LOI ($H_2O$–loss on ignition)=0.5%

Said first embodiment R1 (FIG. 1) is described in detail below and comprises the following steps.

A first step R1F1 comprises the decomposition of fluorosilicic acid (FSA) $H_2SiF_6$ with ammonia and separation of the silica precipitated from the solution of ammonium fluoride $NH_4F$, according to reaction A):

$$H_2SiF_{6(aq)}+6NH_{3(aq)}+2H_2O \rightarrow 6NH_4F_{(aq)}+SiO_{2(solid)} \quad \text{A)}$$

Subsequently, a second step R1F2 comprises the purification of the solution of $NH_4F$ by dosing suitable reagents selected from among nitrate salts such as iron nitrate and/or magnesium nitrate, which enable the elimination, by precipitation and subsequent separation, of the silica still present in the solution of $NH_4F$. It is inadvisable to use chlorinated salts such as iron chloride.

Subsequently, a third step R1F3 comprises the transformation of $NH_4F$ into ammonium bifluoride $NH_4HF_2$ by distillation under reduced pressure (according to reaction B) and consequent recovery of a fraction of $NH_3$ by absorption in an aqueous solution or condensation.

Reaction B) is schematized as follows:

$$2NH_4F_{(aq)} \rightarrow NH_4HF_{2(aq)}+NH_{3(gas)} \quad \text{B)}$$

Subsequently, a fourth step R1F4 comprises the synthesis and precipitation of fluorite $CaF_2$ by reaction of $NH_4HF_{2(aq)}$ with calcium carbonate and simultaneous distillation of free ammonia so as to recover the remaining fraction of $NH_3$ by absorption in an aqueous solution or condensation (reaction C).

Reaction C) is schematized as follows:

$$NH_4HF_{2(aq)}+CaCO_{3(solid)} \rightarrow CaF_{2(solid)}+CO_{2(gas)}+NH_{3(gas)} \quad \text{C)}$$

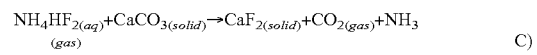

Then follows a drying step until a synthetic fluorite suitable for use in the industrial production of hydrofluoric acid is obtained.

In said first step R1F1, fluorosilicic acid FSA having a concentration comprised from 15 to 30% w/w (weight/ weight), preferably from 20 to 25% w/w, is reacted under constant mechanical stirring with an aqueous solution of $NH_3$ having a concentration comprised from 10 to 35% by weight, preferably from 15 to 25% by weight. The reaction is exothermic and the temperature can reach 90° C.; thus, in order to avoid excessive losses of $NH_3$, the reaction temperature is maintained constant at 50-70° C.

The $NH_3$ is dosed in a stoichiometric excess of about 20-30% by weight on FSA relative to the theoretical value (6 moles of $NH_3$ per mole of FSA). During the hydrolysis step the reagents are added in such a manner that the pH of the solution remains stable at a value of about 9. In a preferred embodiment, in order to maintain a stable pH, FSA in $NH_3$ is added, which assures the obtainment of an easily filtrable silica.

The efficiency of the hydrolysis process closely depends on the speed of addition of the reagents, or FSA in $NH_3$. The total estimated time for obtaining a filterable, high quality silica and completing the hydrolysis reaction is comprised from a total of 2 to 6 hours, preferably from a total of 3 to 5 hours, e.g. a total of 4 hours considering a speed of addition of about 0.01 l/min per 1 litre of 18% $NH_3$ or 23% FSA.

The sequence of addition produces two different reaction environments, an initial and a final environment, which differently influence the quality of the silica obtained, in particular with respect to the structural and surface properties. In fact, the pH of the formation of nuclei, aggregates and agglomerates switches between acid and basic depending on whether $NH_3$ in FSA is added or vice versa. Accordingly, the environment in which the nuclei, aggregates and agglomerates form is different in one case and in the other. The different environment influences the nucleation, aggregation and agglomeration of the amorphous silica produced here.

After few minutes of reaction, silica is formed and a white-coloured suspension is generated. Upon completion of the reaction, the silica present in the suspension is preferably separated from the solution containing ammonium fluoride $NH_4F$ and a slight excess of $NH_3$. The separation of the silica can be carried out by filtration, for example by means of a filter press or strainer filters, or by centrifugation. The first washing water of the silica is recovered in the solution of $NH_4F$; the water from subsequent washing steps is sent off for water purification. Preferably, the final solution is clear and still contains a small fraction of dissolved silica comprised from 1 to 5 g/l. In fact, if the solution is allowed to rest for about 2-4 hours, an additional formation of precipitated silica can be observed.

In said second step R1F2, the silica present in the solution of $NH_4F$ must be eliminated before the synthetic fluorite is produced in order to reduce the content of $SiO_2$ in the finished product. The purification process comprises adding small amounts of an aqueous solution of iron nitrate and/or magnesium nitrate. Advantageously, the optimal dosage in grams is comprised from 0.010 (for example 0.015) to 0.10, preferably from 0.020 (for example 0.025 or 0.030) to 0.080 (for example 0.050) of $Fe(NO_3)_3$ per 1 g of $SiO_2$ present in the solution of $NH_4F$, and from 0.010 (for example 0.015) to 0.10, preferably from 0.020 (for example 0.025 or 0.030) to 0.080 (for example 0.050) $Mg(NO_3)_2$ per 1 g of $SiO_2$ present in the solution of $NH_4F$. The pH of the solution should be greater than 8.5, preferably comprised from 9 to 11, and the reaction time about 45-90 minutes, preferably 60 minutes. Under these conditions the metals precipitate as hydroxides incorporating the silica still present in the solution into the flakes.

The yield of the purification process is greater than 90% (in an experimental trial conducted on a solution comprising $NH_4F$ and $SiO_2$ from said first step R1F1 containing 0.66% $SiO_2$, a solution containing 0.04% $SiO_2$ was obtained after purification (step R1F2)). The reaction can be carried out at room temperature or in any case at the final temperature of the first step, advantageously without requiring a step of cooling the solution of $NH_4F$. The silica present in the suspension obtained is separated by filtration (for example strainer filter).

Said first embodiment R1 includes a distillation process, necessary for the conversion of $NH_4F$ into $(NH_4)HF_2$, which is more reactive. In fact, compared to calcium hydroxide, carbonate does not react spontaneously with $NH_4F$, and it is indispensable to rely on a distillation process in order to drive the reaction towards the formation of fluorite.

In said third step R1F3, the solution of $NH_4F$, which was previously purified from $SiO_2$, is distilled under reduced pressure so as to promote the decomposition of the compound $NH_4F$, which is not very stable, and the transformation thereof into the more stable form $NH_4HF_2$ (reaction B). The decomposition involves the removal of one mole of $NH_3$ per mole of $NH_4F$; the $NH_3$ already present in free form in the solution is added to this amount. The distillation is carried out by increasing the system temperature from 30° C. to 130° C. under a slight negative pressure (approximately 60 mbar below ambient pressure). During the distillation process, carried out at 130° C. and 60 mbar below ambient pressure, the small losses of fluorine which occur are recovered by recycling the ammonia distilled in the process during said first step. The residue of the distillation is likewise a solution, though it is possible to crystallize and isolate ammonium bifluoride in solid form, even though this is not advantageous for the purposes of the process.

Subsequently, the synthesis of fluorite proceeds (said fourth step R1F4) with the addition of calcium carbonate (reaction C) in stoichiometric amounts relative to the fluorine present in the solution of $NH_4HF_2$ obtained above (molar ratio 1:2), so as to avoid the presence of an excess of carbonates in the finished product. Advantageously, the calcium carbonate used must be dry or with a moisture of less than 10% by weight, preferably less than 5% by weight, and in the form of a fine powder.

The chemical quality of the calcium carbonate must be high, with a $CaCO_3$ concentration greater than 97%, advantageously greater than 99%, and a low content of inorganic contaminants ($SiO_2$, $MgCO_3$, and other metals). Advantageously, a calcium carbonate having an average particle size distribution comprised from 50 to 400 microns, preferably from 100 to 200 microns, is used; larger particle sizes are not advisable, as they increase reaction times. The reaction can take place at a temperature of 20° C.; advantageously, in order to improve the recovery of ammonia, it is advisable to work with temperatures of about 60-70° C. and always under a slight negative pressure. The stirring speed should be such as to prevent solid material from depositing on the bottom of the reactor.

Advantageously, although the reaction is practically instantaneous, the best yields are obtained by leaving the fluorite suspension thus produced under constant stirring for at least 30-60 minutes. The fluorite thus obtained is separated from the suspension by filtration.

The filtered product is washed and takes on a slurry-like consistency, with an average residual moisture of about 40%.

Said second embodiment R2 (FIG. 2) is described below in detail and comprises the following steps.

Said first step R2F1 comprises the production of NH$_4$F by basic hydrolysis of H$_2$SiF$_6$ in an aqueous solution having a concentration comprised from 15 to 30% by weight, preferably from 20 to 25% by weight, with an aqueous solution of NH$_3$, under constant mechanical stirring, having a concentration comprised from 10 to 35% by weight, preferably from 15 to 25% by weight.

The reaction is the following:

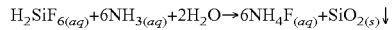

Said first step R2F1 is carried out under the same conditions as in step R1F1.

For example, in a container, e.g. a 500 ml container, containing an amount of ammonia comprised from 200 to 250 g, e.g. 237 g of ammonia (for example, a 30% excess relative to the estimated stoichiometric amount for the reaction) an amount of FSA comprised from 150 to 250 g, preferably 200 g, is added.

Preferably, the dispersion obtained from the above reaction was vigorously stirred, for example for about 20-40 minutes with a mechanical stirrer, e.g. a VELP, monitoring pH and temperature. During this time, the pH remained stable at a value comprised from 8.5 to 9.5, preferably around 9. The temperature rose from 25° C. to about 60-65° C.

Once the stirring time was over, the precipitated silica was preferably separated by filtration, for example by vacuum filtration, preferably at a relative pressure of about 50-150 mbar, even more preferably at a pressure of about 100 mbar. Preferably, the solid thus obtained was re-dispersed in water and filtered under the same operating conditions as described above.

The solid thus obtained was dried, preferably in an oven at about 105-110° C., and weighed. The dried solid was analyzed by XRF.

According to the above operating conditions, the Applicant performed three assays and observed that of the theoretical estimated amount of silica (17.62 g), 15.60 g of silica were obtained in the first assay, 16.40 g in the second assay, and 16.94 g in the third assay.

Preferably, the first silica washing water is added to the initial solution of NH$_4$F.

Said second step R2F2 comprises the purification of NH$_4$F from silica.

The solution containing NH$_4$F, obtained after filtration, is treated/purified (said second step R2F2) under the same operating conditions as described for step R1F2.

For example, a solution containing NH$_4$F, obtained after filtration, is treated/purified with a solution comprising iron (III) nitrate having a concentration comprised from 20 to 60% by weight/volume, preferably from 30 to 50% by weight/volume, and/or magnesium (II) nitrate having a concentration comprised from 40-80% by weight/volume, preferably from 50 to 70% by weight/volume.

For example, the solution containing NH$_4$F, obtained after filtration, is treated with an amount comprised from 0.02 g to 0.08 g, preferably from 0.04 g to 0.06 g of Fe(NO$_3$)$_3$ (ferric nitrate nonahydrate—Fe(NO$_3$)$_3$.9H$_2$O—43.3% weight/volume aqueous solution) and with an amount comprised from 0.05 g to 1 g, preferably from 0.07 to 0.09 g of Mg(NO$_3$)$_2$ (Magnesium Nitrate—Mg(NO$_3$)$_2$—64.4% weight/volume aqueous solution). The solution thus obtained is maintained under stirring for a time comprised from 10 to 90 minutes, preferably 60 minutes, at a temperature comprised from 20 C.° to 25° C.

Then said solution is filtered so as to obtain a substantially silica-free aqueous solution of NH$_4$F.

Subsequently, one proceeds with said third step (R2F3), which comprises treating said substantially silica-free aqueous solution of NH$_4$F directly with calcium hydroxide in an excess amount comprised from 0.01 to 0.5% relative to the stoichiometric amount so as to obtain a dispersion which is maintained under stirring for a time comprised from 10 to 60 minutes at a temperature comprised from 40 to 90° C. Finally, the latter solution is filtered so as to obtain the synthetic fluorite.

The solution is preferably filtered under vacuum at a pressure comprised from 50 mbar to 150 mbar, preferably at 100 mbar, for example with a 0.45 μm filter made of cellulose acetate.

Quantitative analyses of the silica are performed by ICP-AES on the samples of solution of NH$_4$F taken before and after treatment. It was found that, on average, the concentration of SiO$_2$ is decreased by at least 70% by weight in the samples treated with nitrates, for example a content of 2.5 g/l of silica present in a sample was reduced to 0.3 g/l.

Said third step R2F3 comprises the synthesis of CaF$_2$ starting from NH$_4$F in the presence of calcium hydroxide.

The reaction can be schematized as follows:

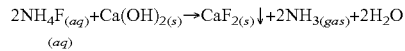

For example, an amount comprised from 250 g to 350 g, preferably 300 g of NH$_4$F, e.g. ammonium fluoride—NH$_4$F—9.5 by weight aqueous solution, was placed in a 500 ml PTFE three-neck flask and reacted with calcium hydroxide Ca(OH)$_2$ (97.8%).

The assays were performed using an excess amount of about 0.3% relative to the stoichiometric amount. In all the assays performed, the dispersion was left under mechanical stirring for a time comprised from 20 to 60 minutes, preferably 30 minutes in an oil bath at a temperature of 80-90° C.

The precipitate (CaF$_2$) was filtered by vacuum filtration at a relative pressure comprised for example from 50 mbar to 150 mbar, preferably 100 mbar, with a filter, e.g. a Whatman 42 paper filter, washed and dried in an oven at a temperature of 110° C. and analyzed by XRF.

The yield of the reaction is greater than 95% and the quantitative analysis of the solid shows a very low percentage of residual silica (less than 0.2% of SiO$_2$). Fluorite washing water does not exhibit residual fluorine and ammonia is recovered at 100% in a closed system.

Alternatively, said third step R2F3 comprises the synthesis of CaF$_2$ starting from NH$_4$F in the presence of calcium carbonate.

The reaction can be schematized as follows:

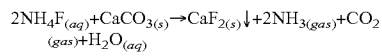

The calcium carbonate is used in an excess amount comprised from 0.01 to 0.5% relative to the stoichiometric amount to yield a dispersion which is maintained under stirring for a time comprised from 10 to 60 minutes, preferably 30 minutes, at a temperature comprised from 60 to 90° C., preferably 80° C.

For example, an amount comprised from 250 g to 350 g, preferably 300 g of NH$_4$F, e.g. ammonium fluoride—NH$_4$F—9.5 by weight aqueous solution, was placed in a 500 ml PTFE three-neck flask and reacted with calcium carbonate.

The assays were performed using an excess amount of 0.3% relative to the stoichiometric amount. In all the assays performed, the dispersion was left under mechanical stirring for a time comprised from 20 to 60 minutes, preferably 30 minutes, in an oil bath at a temperature of 80-90° C.

The precipitate ($CaF_2$) was filtered by vacuum filtration at a relative pressure comprised for example from 50 mbar to 150 mbar, preferably 100 mbar, with a filter, e.g. a Whatman 42 paper filter, washed and dried in an oven at a temperature of 110° C. and analyzed by XRF.

The yield of the reaction is greater than 95% and the quantitative analysis of the solid shows a very low percentage of residual silica (about 0.1% of $SiO_2$). Fluorite washing water does not exhibit residual fluorine and ammonia is recovered at 100% in a closed system.

Figure 3:
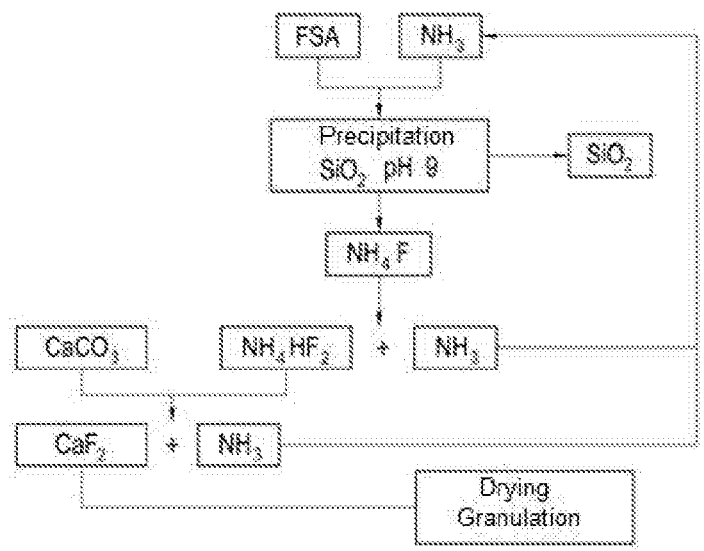
FIG. 3 is a block diagram of the process for preparing high purity synthetic fluorite, like the process of FIG. 1, but without purification of the solution of $NH_4F$.

In a third embodiment R3, the process according to the present invention is represented, by way of example, without limiting, therefore, the scope of the present invention, in the block diagram of FIG. 3 (simplified block diagram of the main steps of the process of the present invention, which comprises the transformation of $NH_4F$ into ammonium bifluoride ($NH_4HF_2$) and the use of $CaCO_3$).

In summary, said third embodiment R3 (FIG. 3 and FIG. 7) comprises the following steps:

1) Decomposition of fluorosilicic acid (FSA) $H_2SiF_6$ FSA with ammonia and separation of the silica precipitated from the solution of ammonium fluoride $NH_4F$ (R3F1).

2) Transformation of $NH_4F$ into ammonium bifluoride $NH_4HF_2$ by distillation under reduced pressure (according to reaction B) and consequent recovery of a fraction of $NH_3$ by absorption in an aqueous solution or condensation (R3F2).

3) Synthesis and precipitation of the synthetic fluorite $CaF_2$ thus obtained by reaction of calcium carbonate or calcium hydroxide $Ca(OH)_2$ with $NH_4HF_2$ and simultaneous distillation of free ammonia so as to recover the remaining fraction of $NH_3$ by absorption in an aqueous solution or condensation (R3F3).

Figure 4:
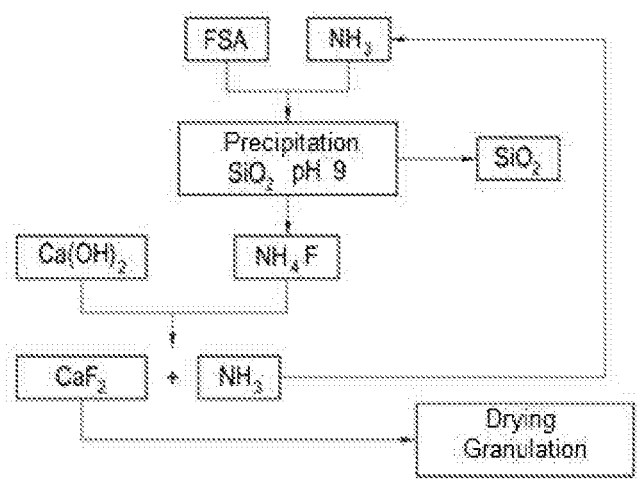
FIG. 4 is a block diagram of the process for preparing high purity synthetic fluorite, like the process of FIG. 2, but without purification of the solution of $NH_4F$.

In a fourth embodiment R4, the process according to the present invention is represented, by way of example, without limiting, therefore, the scope of the present invention, in the block diagram of FIG. 4 (simplified block diagram of the main steps of the process of the present invention, which comprises the purification of the solution of $NH_4F$ and the use of $Ca(OH)_2$).

In summary, said fourth embodiment R4 (FIG. 4 and FIG. 8) comprises the following steps:

1) Decomposition of fluorosilicic acid (FSA) $H_2SiF_6$ FSA with ammonia and separation of the silica precipitated from the solution of ammonium fluoride $NH_4F$ (R2F1).

2) Purification of the solution of $NH_4F$ by dosing suitable reagents which enable the elimination, by precipitation and subsequent separation, of the silica still present in the solution of $NH_4F$ (R2F2).

3) Synthesis and precipitation of the synthetic fluorite $CaF_2$ starting directly from $NH_4F$ in the presence of calcium hydroxide $Ca(OH)_2$ or calcium carbonate (R2F3).

The apparatus according to the present invention is capable of producing, in accordance with the process here disclosed and claimed, a high purity synthetic fluorite (CaF2), classified as "acid grade", which can be used in the industrial production of hydrofluoric acid (HF), starting from fluorosilicic acid (FSA) and calcium hydroxide [$Ca(OH)_2$].

Figure 8:
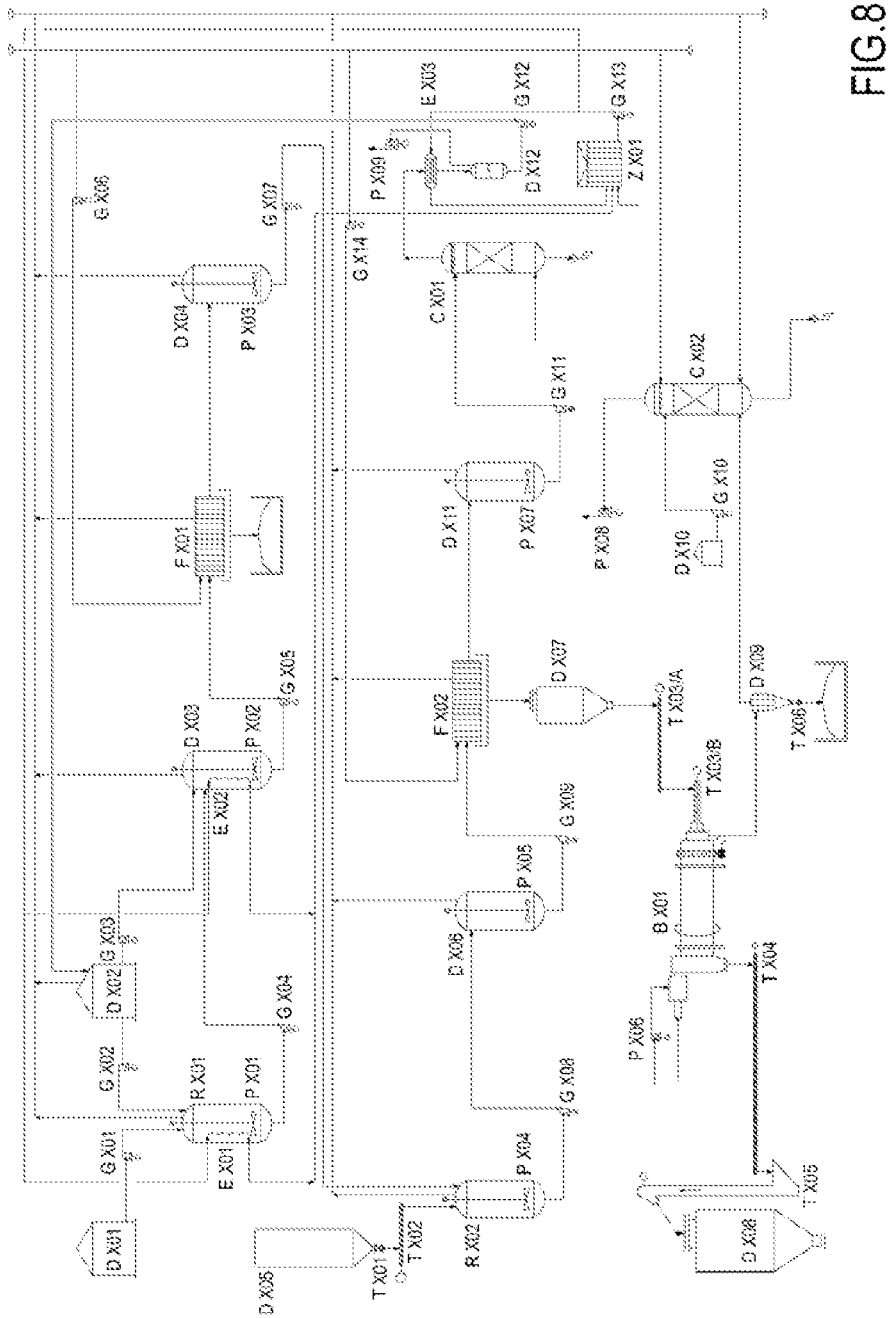

The plant according to the present invention is capable of producing a high purity synthetic fluorite (CaF2) in accordance with the process described in said fourth embodiment R4 (FIG. 4 and FIG. 8). The plant comprises:

Reagent Storage and Feed Section

D x01 (storage tank for the fluorosilicic acid):

Polypropylene tank for storing the fluorosilicic acid, provided with a vacuum breaker valve. The tank is installed inside a suitably sized, insulated polyethylene retention basin equipped with feed and extraction nozzles and a manhole.

G x01 (pump for extracting FSA from D x01):

Horizontally installed centrifugal pump, with a body and impeller made of polypropylene or coated steel. Equipped with a flushed double mechanical seal.

D x02 (ammonia storage tank):

Tank made of carbon steel, suitable for storing ammonia in aqueous solution. Kept under suction by P x08 and provided with a vacuum breaker valve, a suitably sized, insulated polyethylene retention basin equipped with feed and extraction nozzles and a manhole.

G x02 (pump for extracting $NH_3$ from D x02):

Horizontally installed centrifugal pump, with a body and impeller made of polypropylene or coated steel. Equipped with a flushed double mechanical seal.

First Reaction Section

R x01 (FSA hydrolysis reactor):

BATCH-type reactor, made of coated steel (ebonite) or PP, thermoregulated by E X01 and stirred by P x01. Kept under suction by P x08 and provided with reagent feed and product extraction nozzles.

E x01 (cooling coil R x01):

Made of SANICRO 28 (or the like) and supplied with cooling water coming from the tower Z x01. Sized so as to maintain the temperature within 50-60° C.

P x01 (stirrer R x01):

Made of Sanicro 28 (or the like), powered by an electric motor. Designed and sized so as to enable suitable contact between the reagents.

G x04 (pump for extracting slurry from R x01):

Horizontally installed centrifugal pump, with a body and impeller made of polypropylene or coated steel. Equipped with a simple mechanical seal.

D x03 (intermediate tank):

Buffer tank, made of coated steel or PP, thermoregulated by E x02 and stirred by Px02. Kept under suction by P x08 and provided with feed and extraction nozzles.

G x03: (pump for supplying ammonia to D x03)

E x02 (cooling coil D x03):

Made of Sanicro 28 (or the like) and supplied with cooling water coming from the tower Z x01. Sized so as to maintain the temperature within 30° C.

P x02 (stirrer D x03):

Made of Sanicro 28 (or the like), powered by an electric motor. Sized so as to enable suitable contact between the reagents (nitrates) and prevent sedimentation of the silica.

First Filtration Section

G x05 (pump supplying F x01):

Pneumatic diaphragm pump, supplied with instrument air.

F x01 (first filter press):

Automatic filter press, with polypropylene plates and cloths. Provided with drip tray, membrane wringing and blowing, cloth washing and cake washing system. Further equipped with a suction hood connected to P x08.

G x06 (cake washing pump):

Horizontally installed centrifugal pump, with a cast-iron body and impeller, equipped with a simple mechanical seal.

D x04 (intermediate tank):

Made of coated steel or PP. Kept under suction by P x08 and provided with feed and extraction nozzles.

P x03: (stirrer of D x04)

Second Reaction Section

G x07 (pump supplying R x02):

Horizontally installed centrifugal pump, with a body and impeller made of coated steel or PP, equipped with a simple mechanical seal.

D x05 (storage silo for calcium hydroxide):

Made of carbon steel, equipped with a vent provided with bag filter for dust removal and fan. Fed from tanker trucks via a pneumatic conveyor.

T x01 (rotary valve)

T x02 (screw conveyor for extracting calcium hydroxide):

Made of steel, equipped with a balance capable of weighing the calcium hydroxide in a stoichiometric amount to the reactor R x02.

R x02 (reactor for the formation of fluorite):

CSTR-type reactor, made of coated steel (ebonite) or PP and stirred by P x04. Kept under suction by P x08 and provided with reagent feed and product extraction nozzles.

P x04 (stirrer reactor R x02):

Made of Sanicro 28 (or the like), powered by an electric motor. Sized so as to enable suitable contact between the reagents and prevent sedimentation of the fluorite.

G x08 (pump from R x02 a D x06):

Horizontally installed centrifugal pump, with a body and impeller made of coated steel or PP, equipped with a simple mechanical seal.

D x06 (intermediate tank):

Buffer tank, made of coated steel or PP, stirred by Px05. Kept under suction by P x08 and provided with feed and extraction nozzles.

P x05 (stirrer D x06):

Made of Sanicro 28 (or the like), powered by an electric motor. Sized so as to prevent sedimentation of the fluorite.

Second Filtration Section

G x09 (pump supplying F x02):

Pneumatic diaphragm pump, supplied with instrument air.

F x02 (second filter press):

Automatic filter press, with polypropylene plates and cloths. Provided with drip tray, membrane wringing and blowing, cloth washing and cake washing system. A hood kept under suction by P x08 should also be provided.

D x07: silo for collecting wet synthetic fluorite

D x11 (intermediate tank):

Made of carbon steel. Kept under suction by P x09 and provided with feed and extraction nozzles. It serves as a buffer for C x01.

P x07: (stirrer tank D x11)

G x14 (cake washing pump):

Horizontally installed centrifugal pump, with a cast-iron body and impeller, equipped with a simple mechanical seal.

Ammonia Recovery Section

G x11 (pump supplying mother liquors to C x01):

Horizontally installed centrifugal pump, with a cast-iron (steel) body and impeller, equipped with a simple mechanical seal.

C x01 (ammonia stripper):

Made of carbon steel, provided with packing (1 in. metal Raschig rings) of supply nozzles on the head and bottom and a system for feeding the mother liquors to the head. Kept under suction by P x09.

E x03 (condenser):

Made of carbon steel, of the horizontal type with condensation on the shell side. Supplied on the tube side with cooling water coming from the water tower Z x01.

D x12 (accumulation tank):

Made of carbon steel or PP, Kept under suction by P x09.

G x12 (pump supplying condensed ammonia to D x02):

Horizontally installed centrifugal pump, with a body and impeller made of polypropylene or coated steel. Equipped with a flushed double mechanical seal.

P x09 (fan):

Axial fan. Usable pressure such as to ensure suction in C x01.

Vent Cleaning Section

P x08 (fan):

Axial fan.

D x10 (storage tank for $H_2SO_4$):

Small 1 $m^3$ polyethylene tanks.

G x10 (pump supplying $H_2SO_4$ to C x02):

Metering pump.

C x02 (wet scrubber):

Made of PP, packing of plastic material (1 in. Raschig rings), equipped with pH-controlled recirculation tank.

System for feeding sour water at the head. Kept under suction by P x08.

Z x01: (cooling tower)

G x13: pump supplying cooling circuit from Z x01

Fluorite Drying Section

B x01 (dryer):

Rotary oven, provided with a burner, fume particle scrubbing section (cyclone), loading hopper, screw conveyors for feeding and extracting fluorite, gear motor for varying the rotation speed and hydraulic pistons for varying the inclination.

T x03 A/B (screw conveyors for feeding wet fluorite to the rotary oven):

carbon steel screw conveyors, equipped with an electric motor, suitable for feeding fluorite to the rotary oven at a constant flow rate.

T x04 (extracting screw conveyor):

carbon steel screw conveyor, for extracting the granular fluorite from the rotary oven and feeding the bucket elevator T x05. Equipped with an electric motor that runs at constant speed.

T x05 (bucket elevator):

steel bucket elevator, provided with an electric motor. It receives the granular fluorite from the screw conveyor T x04 and feeds the storage silo D x08.

T x06 (rotary valve):

steel rotary valve. It regulates the discharge of the fine particles entrained and entrapped in the cyclone D x09 to a storage reservoir below.

P x06 (fan):

axial fan, provided with an electric motor. It delivers the air flow necessary for combustion in the burner of B x01.

D x08 (storage silo for granular fluorite):

steel (or aluminium) silo, suitable for containing the granular product. Fed from a height by the bucket elevator T x05. Provided with a fan and bag filter for venting into the atmosphere.

D x09 (cyclone):

made of steel, it receives the hot fumes coming out of the rotary oven. It has the purpose of scrubbing and entrapping, by centrifugal force, the fine particles entrained by the turbulence present inside the oven.

1. The ammonia present in the storage tank D x02 is extracted by means of the centrifugal pump G x02 and sent to the batch reactor R x01. Subsequently, the fluorosilicic acid is sent to the reactor from the tank D x01 by means of the centrifugal pump G x01. The reactor R x01, provided with the stirrer P x01 and cooling coil E x01, enables the hydrolysis of the acid to take place completely, leading to the formation of $NH_4F$ and the precipitation of $SiO_2$ according to reaction A.

$$H_2SiF_6 + 6NH_3 + 2H_2O \rightarrow 6NH_4F + SiO_2 \quad \text{A)}$$

1) The slurry produced in R x01 is extracted by means of the centrifugal pump G x04 and sent to the intermediate tank D x03. The slurry is maintained under stirring with P x02 and is cooled by E x02. The pH of the solution can be appropriately adjusted through the addition, by means of the pump G x03, of ammonia from D x02.

2) The slurry is extracted from D x03 by means of the centrifugal pump G x05 and sent to the filter press F x01. Here the silica is retained and the mother liquors are sent to the intermediate tank D x04 stirred by the stirrer P x03. The $SiO_2$ cake is washed with process water, sent by means of the centrifugal pump G x06, in order to recover the fluorine present inside the cake. The washing water is likewise sent to the tank D x04.

3) The mother liquors, extracted from D x04, are sent by means of the centrifugal pump G x07 to the continuous reactor R x02 (stirred by P x04). Simultaneously, the weighing screw conveyor T x02 conveys the calcium hydrate extracted from the silo D x05 by means of the rotary valve T x01 into the reactor R x02, where the reaction B takes place:

$$2NH_4F + Ca(OH)_2 \rightarrow CaF_2\downarrow + 2H_2O + 2NH_3\uparrow \quad \text{B)}$$

4) The slurry produced in R x02 is extracted by means of the centrifugal pump G x08 and sent to the intermediate tank D x06 (stirred by means of P x05).

5) From the intermediate tank the slurry is extracted by means of the centrifugal pump G x09 and sent to the filter press F x02. Here the fluorite is retained and the mother liquors are sent to the buffer tank D x11, stirred by means of the stirrer P x07. The fluorite cake is washed with process water, by means of the pump G x14, to remove the ammonia present in the cake. The washing water is also sent to D x11. The wet fluorite cake is discharged from the filter F x02 and conveyed to the collecting silo D x07.

6) The mother liquors in D x11 are composed of $NH_3$ in a 10% wt solution. In order to be reused as a reagent in A they must be concentrated to 25% wt. Hence, they are extracted by means of the centrifugal pump G x11 and sent to the stripper C x01, kept under suction by the pump P x09. This apparatus is a packed column, fed at the head with the mother liquors containing the ammonia to be concentrated and at the bottom with a vapour stream at 2 bar, and sized so that the overhead product will be vapours containing 25% $NH_3$, which will then be condensed in E x03 and accumulated in D x12. The bottom product consists of the excess water, which will be sent to the water treatment plant.

The 25% ammonia, condensed at a temperature of just above 30° C., is extracted from D x12 by means of the centrifugal pump G x12 and sent to the storage tank D x02. The cooling water for E x03, as well as for E x01 and E x02, is supplied by the cooling tower Z x01, and delivered into the circuit by means of the pump G x13.

7) The apparatus R x01, D x02, D x03, F x01, D x04, R x02, D x06, F x02 and D x11 are kept under suction by the fan P x08, to prevent the dispersion of $NH_3$ vapours into the atmosphere. The vent streams are sent to the bottom of C x02, a wet scrubber fed overhead with a solution of $H_2SO_4$, stored in the tank D x10, by means of the pump G x10, which has the purpose of entrapping the ammonia present in the stream. The vent streams free of ammonia will thus be emitted into the atmosphere and a solution containing ammonium sulphate formed inside the scrubber will be discharged from the bottom of the column.

8) The wet fluorite outfed from the collecting silo D x07 is conveyed inside the rotary oven B x01 by means of the feed screw conveyor T x03A/B. Drying takes place by direct contact of the hot combustion fumes with the wet fluorite. The rotation and high temperature of the oven promote the formation of dried fluorite granules. The air flow necessary for combustion is supplied by the fan P x06, whilst the fine product entrained by the fumes coming out of the oven B x01 is entrapped by the cyclone D x09 before being sent to the scrubber C x02. The dried fluorite in the form of a fine powder is then discharged from the cyclone D x09 by means of the rotary valve T x06, and can be recovered at the overhead of the drying process. The dried fluorite, in the form of granules, is then unloaded from the oven on the extraction screw conveyor T x04 and conveyed to the bucket elevator T x05 in order to then be stored in the storage silo D x08.

Figure 7:
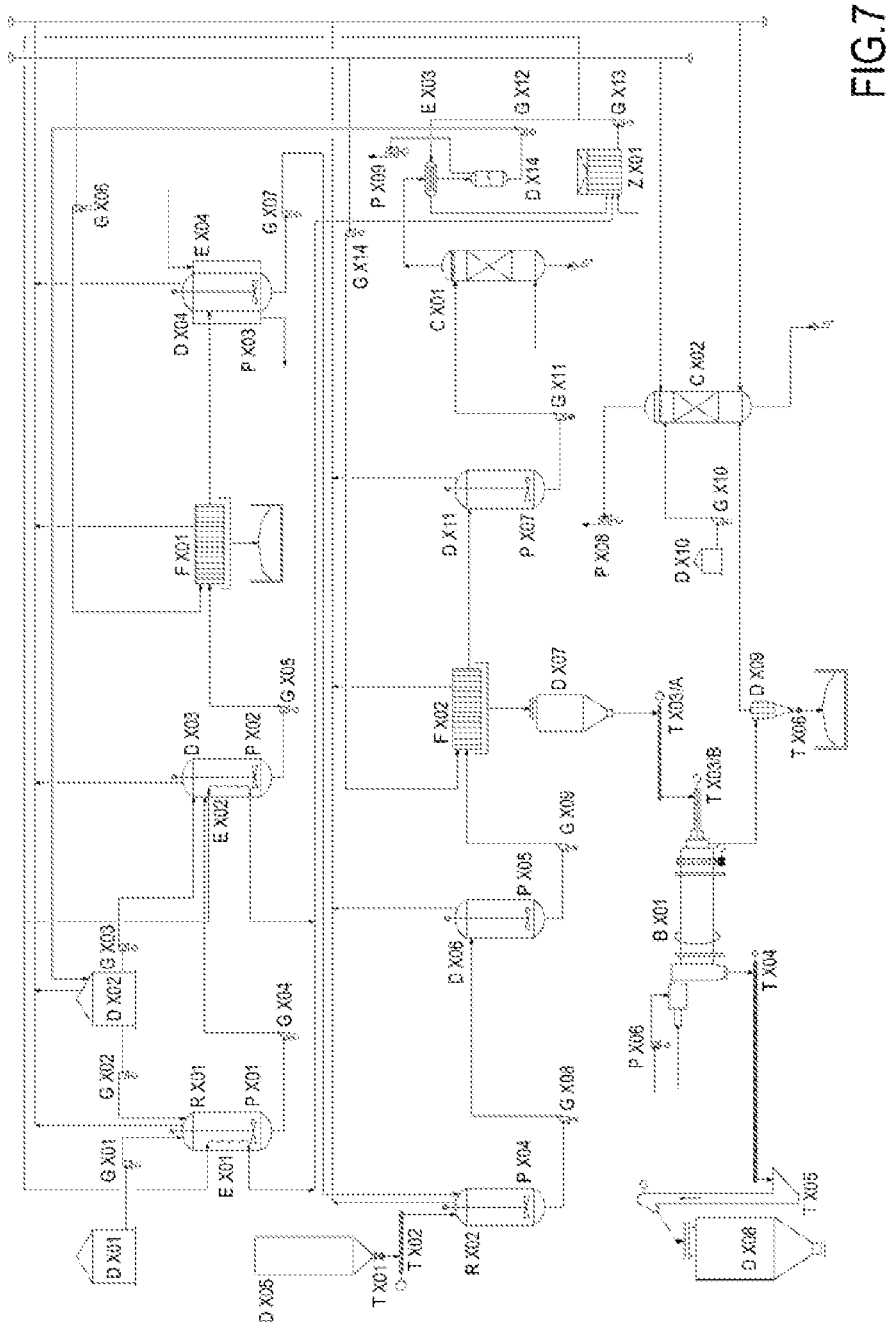
FIG. 7 is a schematic view of the apparatus according to the present invention for preparing said high purity synthetic fluorite ($CaF_2$) in accordance with embodiment R3, as exemplified in FIG. 3; and, FIG. 8 is a schematic view of the apparatus according to the present invention for preparing said high purity synthetic fluorite ($CaF_2$) in accordance with embodiment R4, as exemplified in FIG. 4.

The plant according to the present invention is capable of producing a high purity synthetic fluorite ($CaF_2$) in accordance with the process described in said third embodiment R3 (FIG. 3 and FIG. 7). The plant comprises:

Reagent Storage and Feed Section

D x01 (storage tank for the fluorosilicic acid):
Polypropylene tank for storing the fluorosilicic acid, provided with a vacuum breaker valve. The tank is installed inside a suitably sized, insulated polyethylene retention basin equipped with feed and extraction nozzles and a manhole.

G x01 (pump for extracting FSA from D x01):
Horizontally installed centrifugal pump, with a body and impeller made of polypropylene or coated steel. Equipped with a flushed double mechanical seal.

D x02 (ammonia storage tank):
Tank made of carbon steel, suitable for storing ammonia in aqueous solution. Kept under suction by P x08 and provided with a vacuum breaker valve, a suitably sized, insulated polyethylene retention basin equipped with feed and extraction nozzles and a manhole.

G x02 (pump for extracting $NH_3$ from D x02):
Horizontally installed centrifugal pump, with a body and impeller made of polypropylene or coated steel. Equipped with a flushed double mechanical seal.

First Reaction Section

R x01 (FSA hydrolysis reactor):
BATCH-type reactor, made of coated steel (ebonite) or PP, thermoregulated by E X01 and stirred by P x01. Kept under suction by P x08 and provided with reagent feed and product extraction nozzles.

E x01 (cooling coil R x01):
Made of SANICRO 28 (or the like) and supplied with cooling water coming from the tower Z x01. Sized so as to maintain the temperature within 50-60° C.

P x01 (stirrer R x01):
Made of Sanicro 28 (or the like), powered by an electric motor. Designed and sized so as to enable suitable contact between the reagents.

G x04 (pump for extracting slurry from R x01):
Horizontally installed centrifugal pump, with a body and impeller made of polypropylene or coated steel. Equipped with a simple mechanical seal.

D x03 (intermediate tank):
Buffer tank, made of coated steel or PP, thermoregulated by E x02 and stirred by P x02. Kept under suction by P x08 and provided with feed and extraction nozzles.

G x03: (pump for supplying ammonia to D x03)

E x02 (cooling coil D x03):
Made of Sanicro 28 (or the like) and supplied with cooling water coming from the tower Z x01. Sized so as to maintain the temperature within 30° C.

P x02 (stirrer D x03):

Made of Sanicro 28 (or the like), powered by an electric motor. Sized so as to enable suitable contact between the reagents (nitrates) and prevent sedimentation of the silica.

First Filtration Section

G x05 (pump supplying F x01):

Pneumatic diaphragm pump, supplied with instrument air.

F x01 (first filter press):

Automatic filter press, with polypropylene plates and cloths. Provided with drip tray, membrane wringing and blowing, cloth washing and cake washing system. Further equipped with a suction hood connected to P x08.

G x06 (cake washing pump):

Horizontally installed centrifugal pump, with a cast-iron body and impeller, equipped with a simple mechanical seal.

D x04 (evaporator):

Made of coated steel. Kept under suction by P x08 and provided with feed and extraction nozzles. The increase in temperature (up to 130° C.) enables ammonium fluoride to be converted into ammonium bifluoride, which is more reactive toward $CaCO_3$.

P x03: (stirrer evaporator D x04)

E x04 (heating jacket D x04):

Made of carbon steel and supplied with steam. Sized so as to bring the temperature inside D x04 up to about 130° C.

Second Reaction Section

G x07 (pump supplying R x02):

Horizontally installed centrifugal pump, with a body and impeller made of coated steel or PP, equipped with a simple mechanical seal.

D x05 (storage silo for carbonate):

Made of carbon steel, equipped with a vent provided with bag filter for dust removal and fan. Fed from tanker trucks via a pneumatic conveyor.

T x01 (rotary valve)

T x02 (screw conveyor for extracting carbonate):

Made of steel, equipped with a balance capable of weighing the carbonate in a stoichiometric amount to the reactor R x02.

R x02 (reactor for the formation of fluorite):

CSTR-type reactor, made of coated steel (ebonite) or PP and stirred by P x04. Kept under suction by P x08 and provided with reagent feed and product extraction nozzles.

P x04 (stirrer reactor R x02):

Made of Sanicro 28 (or the like), powered by an electric motor. Sized so as to enable suitable contact between the reagents and prevent sedimentation of the fluorite.

G x08 (pump from R x02 a D x06):

Horizontally installed centrifugal pump, with a body and impeller made of coated steel or PP, equipped with a simple mechanical seal.

D x06 (intermediate tank):

Buffer tank, made of coated steel or PP, stirred by Px05. Kept under suction by P x08 and provided with feed and extraction nozzles.

P x05 (stirrer D x06):

Made of Sanicro 28 (or the like), powered by an electric motor. Sized so as to prevent sedimentation of the fluorite.

Second Filtration Section

G x09 (pump supplying F x02):

Pneumatic diaphragm pump, supplied with instrument air.

F x02 (second filter press):

Automatic filter press, with polypropylene plates and cloths. Provided with drip tray, membrane wringing and blowing, cloth washing and cake washing system. A hood kept under suction by P x08 should also be provided.

D x07: silo for collecting wet synthetic fluorite

D x11 (intermediate tank):

Made of carbon steel. Kept under suction by P x09 and provided with feed and extraction nozzles. It serves as a buffer for C x01.

P x07: stirrer tank D x11

G x14 (cake washing pump):

Horizontally installed centrifugal pump, with a cast-iron body and impeller, equipped with a simple mechanical seal.

Ammonia Recovery Section

G x11 (pump supplying mother liquors to C x01):

Horizontally installed centrifugal pump, with a cast-iron (steel) body and impeller, equipped with a simple mechanical seal.

C x01 (ammonia stripper):

Made of carbon steel, provided with packing (1 in. metal Raschig rings), overhead and bottom feed nozzles and a system for feeding the mother liquors to the head. Kept under suction by P x09.

E x03 (condenser):

Made of carbon steel, of the horizontal type with condensation on the shell side. Supplied on the tube side with cooling water coming from the water tower Z x01.

D x14 (accumulation tank):

Made of carbon steel or PP, Kept under suction by P x09.

G x12 (pump supplying condensed ammonia to D x02):

Horizontally installed centrifugal pump, with a body and impeller made of polypropylene or coated steel. Equipped with a flushed double mechanical seal.

P x09 (fan):

Axial fan. Head such as to guarantee suction in C x01.

Vent Cleaning Section

P x08 (fan):

Axial fan.

D x10 (storage tank for $H_2SO_4$):

Small 1 $m^3$ polyethylene tanks.

G x10 (pump supplying $H_2SO_4$ a C x02):

Metering pump.

C x02 (wet scrubber):

Made of PP, packing made of plastic material (1 in. Raschig rings), equipped with pH-controlled recirculation tank. System for feeding sour water at the head. Kept under suction by P x08.

Z x01: (cooling tower)

G x13: pump supplying the cooling circuit from Z x01

Fluorite Drying Section

B x01 (dryer):

Rotary oven, provided with a burner, fume particle scrubbing section (cyclone), loading hopper, screw conveyors for feeding and extracting fluorite, gear motor for varying the rotation speed and hydraulic pistons for varying the inclination.

T x03 A/B (screw conveyors for feeding wet fluorite to the rotary oven):

carbon steel screw conveyors, equipped with an electric motor, suitable for feeding fluorite to the rotary oven at a constant flow rate.

T x04 (extracting screw conveyor):

carbon steel screw conveyor, for extracting the granular fluorite from the rotary oven and feeding the bucket elevator T x05. Equipped with an electric motor that runs at constant speed.

T x05 (bucket elevator):

steel bucket elevator, provided with an electric motor. It receives the granular fluorite from the screw conveyor T x04 and feeds the storage silo D x08.

T x06 (rotary valve):

steel rotary valve. It regulates the discharge of the fine particles entrained and entrapped in the cyclone D x09 to a storage reservoir below.

P x06 (fan):
axial fan, provided with an electric motor. It delivers the air flow necessary for combustion in the burner of B x01.

D x08 (storage silo for granular fluorite):
steel (or aluminium) silo, suitable for containing the granular product. Fed from a height by the bucket elevator T x05. Provided with a fan and bag filter for venting into the atmosphere.

D x09 (cyclone): made of steel, it receives the hot fumes coming out of the rotary oven. It has the purpose of scrubbing and entrapping, by centrifugal force, the fine particles entrained by the turbulence present inside the oven.

1) The ammonia present in the storage tank D x02 is extracted by means of the centrifugal pump G x02 and sent to the batch reactor R x01. Subsequently, the fluorosilicic acid is sent from D x01 to the reactor by means of the centrifugal pump G x01. The reactor R x01, provided with the stirrer P x01 and cooling coil E x01, enables the hydrolysis of the acid to take place completely, leading to the formation of $NH_4F$ and the precipitation of $SiO_2$ according to reaction A.

$$H_2SiF_6 + 6NH_3 + 2H_2O \rightarrow 6NH_4F + SiO_2 \qquad A)$$

1) The slurry produced in R x01 is extracted by means of the centrifugal pump G x04 and sent to the intermediate tank D x03. The slurry is maintained under stirring with P x02 and is cooled by E x02. The pH of the solution can be appropriately adjusted through the addition, by means of the pump G x03, of ammonia from D x02.

2) The slurry is extracted from D x03 by means of the centrifugal pump G x05 and sent to the filter press F x01. Here the silica is retained and the mother liquors are sent to the exchanger/evaporator D x04, consisting of a stirrer P x03 and a heating jacket E x04. In this step, the ammonium fluoride, brought to about 130° C. by a vapour stream, degrades into ammonium bifluoride (more reactive toward calcium carbonate), releasing a mole of $NH_3$ (reaction B). The $SiO_2$ cake is washed with process water, sent by means of the centrifugal pump G x06, in order to recover the fluorine present inside the cake. The washing water is likewise sent to the tank D x04.

$$2NH_4F \rightarrow NH_4HF_2 + NH_3 \qquad B)$$

3) The mother liquors, extracted from D x04, are sent by means of the centrifugal pump G x07 to the continuous reactor R x02 (stirred by P x04). Simultaneously, the weighing screw conveyor T x02 conveys the calcium carbonate extracted from the silo D x05, by means of the rotary valve T x01, into the reactor R x02, where the reaction C takes place:

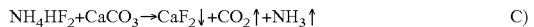

$$NH_4HF_2 + CaCO_3 \rightarrow CaF_2\downarrow + CO_2\uparrow + NH_3\uparrow \qquad C)$$

4) The slurry produced in R x02 is extracted by means of the centrifugal pump G x08 and sent to the intermediate tank D x06 (stirred by means of P x05).

5) From the intermediate tank the slurry is extracted by means of the centrifugal pump G x09 and sent to the filter press F x02. Here the fluorite is retained and the mother liquors are sent to the buffer tank D x11, stirred by the stirrer P x07. The fluorite cake is washed with process water, by means of the pump G x14, to remove the ammonia present in the cake. The washing water is also sent to D x11. The wet washed fluorite cake is discharged from the filter and conveyed to the storage silo D x07.

6) The mother liquors in D x11 are composed of $NH_3$ in a 10% wt solution. In order to be reused as a reagent in A they must be concentrated to 25% wt. Hence, they are extracted by means of the centrifugal pump G x11 and sent to the stripper C x01, kept under suction by the pump P x09. This apparatus is a packed column, fed overhead with the mother liquors containing the ammonia to be concentrated and at the bottom with a vapour stream at 2 bar, and sized so that the overhead product will be vapours containing 25% $NH_3$, which will then be condensed in E x03 and accumulated in D x14. The bottom product consists of the excess water, which will be sent to the water treatment plant.

The 25% ammonia, condensed at a temperature of just above 30° C., is extracted from D x14 by means of the centrifugal pump G x12 and sent to the storage tank D x02. The cooling water for E x03, as well as for E x01 and E x02, is supplied by the cooling tower Z x01 and introduced into the circuit by means of the pump G x13.

7) The apparatus R x01, D x02, D x03, F x01, D x04, R x02, D x06, F x02 and D x11 are kept under suction by the fan P x08, to prevent the dispersion of $NH_3$ vapours into the atmosphere. The vent streams are sent to the bottom of C x02, a wet scrubber fed overhead by means of the pump G x10 with a solution of $H_2SO_4$, stored in the tank D x10 and which has the purpose of entrapping the ammonia present in the stream. The vent streams free of ammonia will thus be emitted into the atmosphere and a solution containing ammonium sulphate formed inside the scrubber will be discharged from the bottom of the column.

8) The wet fluorite outfed from the collecting silo D x07 is conveyed inside the rotary oven B x01 by means of the feed screw conveyor T x03A/B. Drying takes place by direct contact of the hot combustion fumes with the wet fluorite. The rotation and high temperature of the oven promote the formation of dried fluorite granules. The air flow necessary for combustion is supplied by the fan P x06, whilst the fine product entrained by the fumes coming out of the oven B x01 is entrapped by the cyclone D x09 before being sent to the scrubber C x02. The dried fluorite in the form of a fine powder is then discharged from the cyclone D x09 by means of the rotary valve T x06, and can be recovered at the overhead of the drying process. The dried fluorite, in the form of granules, is then unloaded from the oven on the extraction screw conveyor T x04 and conveyed to the bucket elevator T x05 in order to then be stored in the storage silo D x08.

Figure 6:
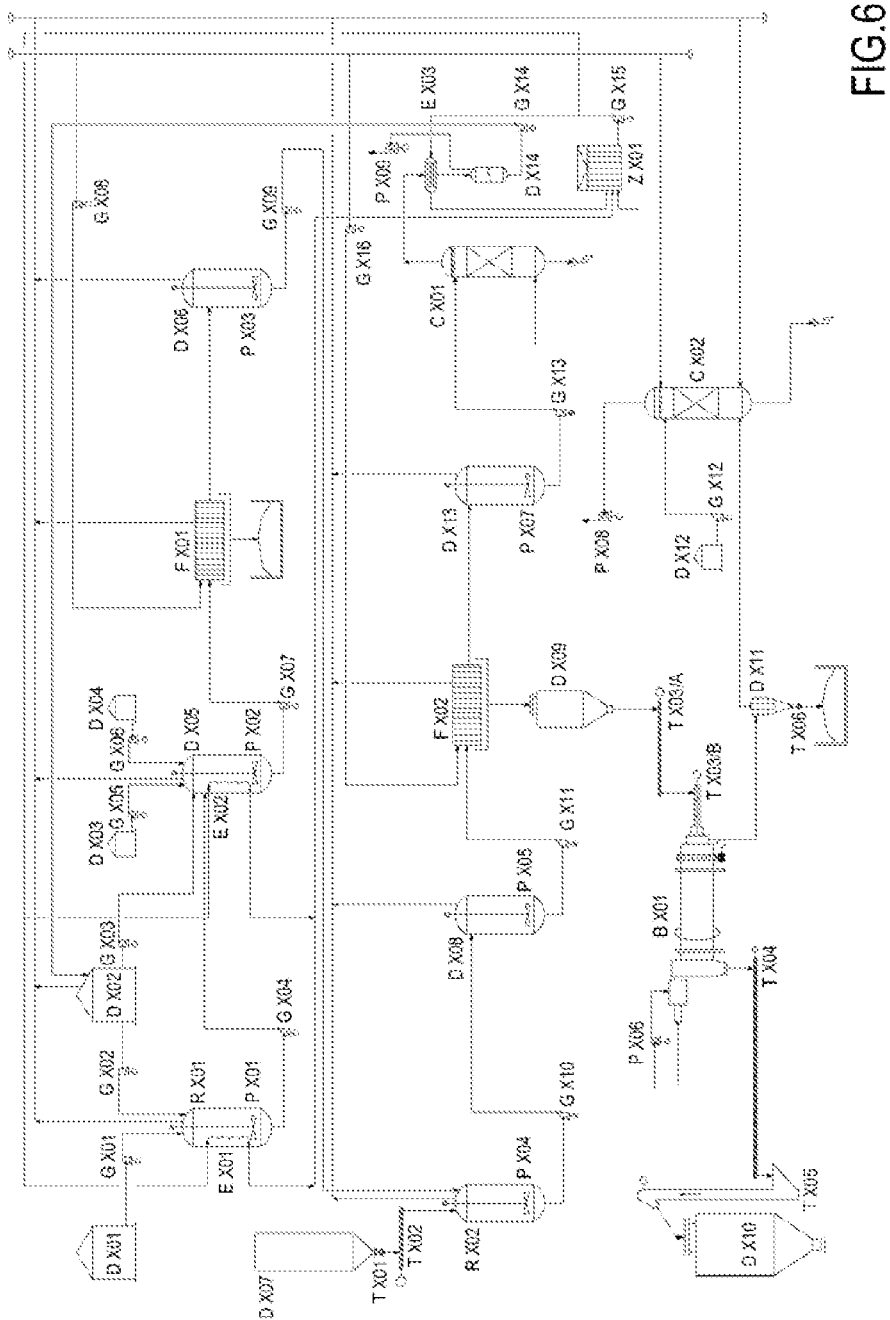
FIG. 6 is a schematic view of the apparatus according to the present invention for preparing said high purity synthetic fluorite ($CaF_2$) in accordance with embodiment R2, as exemplified in FIG. 2.

The plant according to the present invention is capable of producing a high purity synthetic fluorite ($CaF2$) in accordance with the process described in said second embodiment R2 (FIG. 2 and FIG. 6). The plant comprises:

Reagent Storage and Feed Section

D x01 (storage tank for the fluorosilicic acid):
Polypropylene tank for storing the fluorosilicic acid, provided with a vacuum breaker valve. The tank is installed inside a suitably sized, insulated polyethylene retention basin equipped with feed and extraction nozzles and a manhole.

G x01 (pump for extracting FSA from D x01):
Horizontally installed centrifugal pump, with a body and impeller made of polypropylene or coated steel. Equipped with a flushed double mechanical seal.

D x02 (ammonia storage tank):
Tank made of carbon steel, suitable for storing ammonia in aqueous solution. Kept under suction by P x08 and provided with a vacuum breaker valve, a suitably sized, insulated polyethylene retention basin equipped with feed and extraction nozzles and a manhole.

G x02 (pump for extracting $NH_3$ from D x02):
Horizontally installed centrifugal pump, with a body and impeller made of polypropylene or coated steel. Equipped with a flushed double mechanical seal.

First Reaction Section

R x01 (FSA hydrolysis reactor):
BATCH-type reactor, made of coated steel (ebonite) or PP, thermoregulated by E x01 and stirred by P x01. Kept under suction by P x08 and provided with reagent feed and product extraction nozzles.

E x01 (cooling coil R x01):
Made of SANICRO 28 (or the like) and supplied with cooling water coming from the tower Z x01. Sized so as to maintain the temperature within 50-60° C.

P x01 (stirrer R x01):
Made of Sanicro 28 (or the like), powered by an electric motor. Designed and sized so as to enable suitable contact between the reagents.

G x04 (pump for extracting slurry from R x01):
Horizontally installed centrifugal pump, with a body and impeller made of polypropylene or coated steel. Equipped with a simple mechanical seal.

D x05 (intermediate tank):
Buffer tank, made of coated steel or PP, thermoregulated by E x02 and stirred by P x02. Kept under suction by P x08 and provided with feed and extraction nozzles.

E x02 (cooling coil D x05):
Made of Sanicro 28 (or the like) and supplied with cooling water coming from the tower Z x01. Sized so as to maintain the temperature within 30° C.

P x02 (stirrer P x05):
Made of Sanicro 28 (or the like), powered by an electric motor. Sized so as to enable suitable contact between the reagents (nitrates) and prevent sedimentation of the silica.

Dx03 and Dx04 (storage tank for $Mg(NO_3)_2$ and $Fe(NO_3)_3$ in solution):
Small 1 $m^3$ polyethylene tanks.

G x03: (pump for supplying ammonia to D x05)

G x05 and G x06 (nitrate extraction pumps):
Small metering pumps.

First Filtration Section

G x07 (pump supplying F x01):
Pneumatic diaphragm pump, supplied with instrument air.

F x01 (first filter press):
Automatic filter press, with polypropylene plates and cloths. Provided with drip tray, membrane wringing and blowing, cloth washing and cake washing system. Further equipped with a suction hood connected to P x08.

G x08 (cake washing pump):
Horizontally installed centrifugal pump, with a cast-iron body and impeller, equipped with a simple mechanical seal.

D x06 (intermediate tank):
Made of coated steel or PP. Kept under suction by P x08 and provided with feed and extraction nozzles.

P x03 (stirrer tank D x06)

Second Reaction Section

G x09 (pump supplying R x02):
Horizontally installed centrifugal pump, with a body and impeller made of coated steel or PP, equipped with a simple mechanical seal.

D x07 (storage silo for calcium hydroxide):
Made of carbon steel, equipped with a vent provided with bag filter for dust removal and fan. Fed from tanker trucks via a pneumatic conveyor.

T x01 (rotary valve)

T x02 (screw conveyor for extracting calcium hydroxide):
Made of steel, equipped with a balance capable of weighing the calcium hydroxide in a stoichiometric amount to the reactor R x02.

R x02 (reactor for the formation of fluorite):
CSTR-type reactor, made of coated steel (ebonite) or PP and stirred by P x04. Kept under suction by P x08 and provided with reagent feed and product extraction nozzles.

P x04 (stirrer reactor R x02):
Made of Sanicro 28 (or the like), powered by an electric motor. Sized so as to enable suitable contact between the reagents and prevent sedimentation of the fluorite.

G x10 (pump from R x02 to D x08):
Horizontally installed centrifugal pump, with a body and impeller made of coated steel or PP, equipped with a simple mechanical seal.

D x08 (intermediate tank):
Buffer tank, made of coated steel or PP, stirred by P x05. Kept under suction by P x08 and provided with feed and extraction nozzles.

P x05 (stirrer D x08):
Made of Sanicro 28 (or the like), powered by an electric motor. Sized so as to prevent sedimentation of the fluorite.

Second Filtration Section

G x11 (pump supplying F x02):
Pneumatic diaphragm pump, supplied with instrument air.

F x02 (second filter press):
Automatic filter press, with polypropylene plates and cloths. Provided with drip tray, membrane wringing and blowing, cloth washing and cake washing system. A hood kept under suction by P x08 should also be provided.

D x09: silo for collecting wet synthetic fluorite

D x13 (intermediate tank):
Made of carbon steel. Kept under suction by P x09 and provided with feed and extraction nozzles. It serves as a buffer for C x01.

P x07: stirrer tank D x13

G x16 (cake washing pump):
Horizontally installed centrifugal pump, with a cast-iron body and impeller, equipped with a simple mechanical seal.

Ammonia Recovery Section

G x13 (pump supplying mother liquors to C x01):
Horizontally installed centrifugal pump, with a cast-iron (steel) body and impeller, equipped with a simple mechanical seal.

C x01 (ammonia stripper):
Made of carbon steel, provided with packing (1 in. metal Raschig rings), overhead and bottom feed nozzles and a system for feeding the mother liquors to the head. Kept under suction by P x09.

E x03 (condenser):
Made of carbon steel, of the horizontal type with condensation on the shell side. Supplied on the tube side with cooling water coming from the water tower Z x01.

D x14 (accumulation tank):
Made of carbon steel or PP, Kept under suction by P x09.

G x14 (pump supplying condensed ammonia to D x02):
Horizontally installed centrifugal pump, with a body and impeller made of polypropylene or coated steel. Equipped with a flushed double mechanical seal.

P x09 (fan):
Axial fan. Head such as to guarantee suction in C x01.

Vent Cleaning Section

P x08 (fan):
Axial fan.

D x12 (storage tank for $H_2SO_4$):
Small 1 $m^3$ polyethylene tanks.

G x12 (pump supplying $H_2SO_4$ to C x02):
Metering pump.

C x02 (wet scrubber):
Made of PP, packing made of plastic material (1 in. Raschig rings), equipped with pH-controlled recirculation tank. System for feeding sour water at the head. Kept under suction by P x08.

Z x01: (cooling tower) G x15: pump supplying cooling circuit from Z x01

Fluorite Drying Section

B x01 (dryer):
Rotary oven, provided with a burner, fume particle scrubbing section (cyclone), loading hopper, screw conveyors for feeding and extracting fluorite, gear motor for varying the rotation speed and hydraulic pistons for varying the inclination.

T x03 A/B (screw conveyors for feeding wet fluorite to the rotary oven):
carbon steel screw conveyors, equipped with an electric motor, suitable for feeding fluorite to the rotary oven at a constant flow rate.

T x04 (extracting screw conveyor):
carbon steel screw conveyor, for extracting the granular fluorite from the rotary oven and feeding the bucket elevator T x05. Equipped with an electric motor that runs at constant speed.

T x05 (bucket elevator):
steel bucket elevator, provided with an electric motor. It receives the granular fluorite from the screw conveyor T x04 and feeds the storage silo D x10.

T x06 (rotary valve):
steel rotary valve. It regulates the discharge of the fine particles entrained and entrapped in the cyclone D x11 to a storage reservoir below.

P x06 (fan):
axial fan, provided with an electric motor. It delivers the air flow necessary for combustion in the burner of B x01.

D x10 (storage silo for granular fluorite):
steel (or aluminium) silo, suitable for containing the granular product. Fed from a height by the bucket elevator T x05. Provided with a fan and bag filter for venting into the atmosphere.

D x11 (cyclone):
made of steel, it receives the hot fumes coming out of the rotary oven. It has the purpose of scrubbing and entrapping, by centrifugal force, the fine particles entrained by the turbulence present inside the oven.

1) The ammonia present in the storage tank D x02 is extracted by means of the centrifugal pump G x02 and sent to the batch reactor R x01. Subsequently, the fluorosilicic acid is sent from D x01 to the reactor by means of the centrifugal pump G x01. The reactor R x01, provided with the stirrer P x01 and cooling coil E x01, enables the hydrolysis of the acid to take place completely, leading to the formation of $NH_4F$ and the precipitation of $SiO_2$ according to reaction A.

$$H_2SiF_6 + 6NH_3 + 2H_2O \rightarrow 6NH_4F + SiO_2\downarrow \quad\quad A)$$

2) The slurry produced in R x01 is extracted by means of the centrifugal pump G x04 and sent to the intermediate tank D x05. The slurry is maintained under stirring with P x02 and is cooled by E x02. In this step a solution of $Mg(NO_3)_2$ and $Fe(NO_3)_3$ is also fed from D x02 and D x04 by the pumps G x05 and G x06, respectively. The pH of the solution can be appropriately adjusted through the addition, by means of the pump G x03, of ammonia from D x02.

3) The slurry is extracted from D x05 by means of the centrifugal pump G x07 and sent to the filter press F x01. Here the silica is retained and the mother liquors are sent to the intermediate tank D x06, maintained under constant stirring by the stirrer P x03. The $SiO_2$ cake is washed with process water, sent by means of the centrifugal pump G x08, in order to recover the fluorine present inside the cake. The washing water is likewise sent to the tank D x06.

4) The mother liquors, extracted from D x06, are sent by means of the centrifugal pump G x09 to the continuous reactor R x02 (stirred by P x04). Simultaneously, the weighing screw conveyor T x02 conveys the calcium hydrate extracted from the silo D x07 by means of the rotary valve T x01 into the reactor R x02, where the reaction B takes place:

$$2NH_4F + Ca(OH)_2 \rightarrow CaF_2\downarrow + 2H_2O + 2NH_3\uparrow \quad\quad B)$$

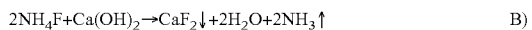

5) The slurry produced in R x02 is extracted by means of the centrifugal pump G x10 and sent to the intermediate tank D x08 (stirred by means of P x05).

6) From the intermediate tank D x08 the slurry is extracted by means of the centrifugal pump G x11 and sent to the filter press F x02. Here the fluorite is retained and the mother liquors are sent to the buffer tank D x13, maintained under constant stirring by the stirrer P x07. The fluorite cake is washed with process water to remove the ammonia present in the cake, by means of the pump G x16. The washing water is also sent to D x13. The wet fluorite cake is discharged from the filter F x02 and conveyed to the collecting silo D x09.

7) The mother liquors in D x13 are composed of $NH_3$ in a 10% wt solution. In order to be reused as a reagent in A they must be concentrated to 25% wt. Hence, they are extracted by means of the centrifugal pump G x13 and sent to the stripper C x01, kept under suction by the pump P x09. This apparatus is a packed column, fed overhead with the mother liquors containing the ammonia to be concentrated and at the bottom with a vapour stream at 2 bar, and sized so that the overhead product will be vapours containing 25% $NH_3$, which will then be condensed in E x03 and accumulated in D x14. The bottom product consists of the excess water, which will be sent to the water treatment plant.

The 25% ammonia, condensed at a temperature just above 30° C., is extracted from D x14 by means of the centrifugal pump G x14 and sent to the storage tank D x02. The cooling water for E x03, as well as for E x01 and E x02, is supplied by the cooling tower Z x01, which supplies the circuit by means of the pump G x15.

8) The apparatus R x01, D x02, D x05, F x01, D x06, R x02, D x08, F x02 and D x13 are kept under suction by the fan P x08, to prevent the dispersion of $NH_3$ vapours into the atmosphere. The vent streams are sent to the bottom of C x02, a wet scrubber fed overhead with a solution of $H_2SO_4$, stored in the tank D x12 and fed by means of the pump G x12, which has the purpose of entrapping the ammonia present in the stream. The vent streams free of ammonia will thus be emitted into the atmosphere and a solution containing ammonium sulphate formed inside the scrubber will be discharged from the bottom of the column.

9) The wet fluorite outfed from the collecting silo D x09 is conveyed inside the rotary oven B x01 by means of the feed screw conveyor T x03A/B. Drying takes place by direct contact of the hot combustion fumes with the wet fluorite. The rotation and high temperature of the oven promote the formation of dried fluorite granules. The air flow necessary for combustion is supplied by the fan P x06, whilst the fine product entrained by the fumes coming out of the oven B x01 is entrapped by the cyclone D x11 before being sent to the scrubber C x02. The dried fluorite in the form of a fine powder is then discharged from the cyclone D x11 by means of the rotary valve T x06, and can be recovered at the overhead of the drying process. The dried fluorite, in the form of granules, is then unloaded from the oven on the extraction screw conveyor T x04 and conveyed to the bucket elevator T x05 in order to then be stored in the storage silo D x10.

Figure 5:
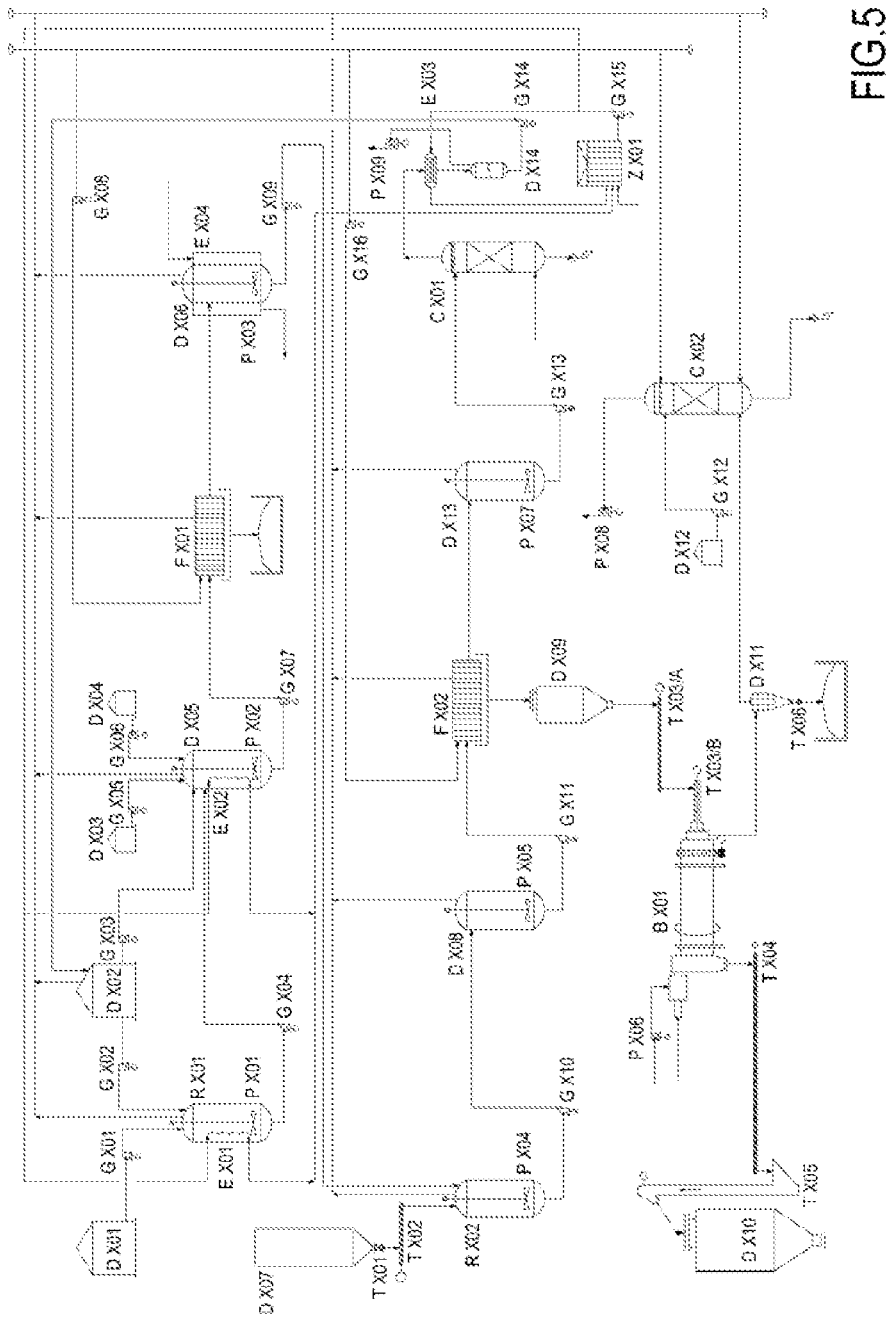
FIG. 5 is a schematic view of the apparatus according to the present invention for preparing said high purity synthetic fluorite ($CaF_2$) in accordance with embodiment R1, as exemplified in FIG. 1.

The plant according to the present invention is capable of producing a high purity synthetic fluorite ($CaF_2$) in accordance with the process described in said first embodiment R1 (FIG. 1 and FIG. 5). The plant comprises:

Reagent Storage and Feed Section

D x01 (storage tank for the fluorosilicic acid):

Polypropylene tank for storing the fluorosilicic acid, provided with a vacuum breaker valve. The tank is installed inside a suitably sized, insulated polyethylene retention basin equipped with feed and extraction nozzles and a manhole.

G x01 (pump for extracting FSA from D x01):

Horizontally installed centrifugal pump, with a body and impeller made of polypropylene or coated steel. Equipped with a flushed double mechanical seal.

D x02 (ammonia storage tank):

Tank made of carbon steel, suitable for storing ammonia in aqueous solution. Kept under suction by P x08 and provided with a vacuum breaker valve, a suitably sized, insulated polyethylene retention basin equipped with feed and extraction nozzles and a manhole.

G x02 (pump for extracting $NH_3$ from D x02):

Horizontally installed centrifugal pump, with a body and impeller made of polypropylene or coated steel. Equipped with a flushed double mechanical seal.

First Reaction Section

R x01 (FSA hydrolysis reactor):

BATCH-type reactor, made of coated steel (ebonite) or PP, thermoregulated by E x01 and stirred by P x01. Kept under suction by P x08 and provided with reagent feed and product extraction nozzles.

E x01 (cooling coil R x01):

Made of SANICRO 28 (or the like) and supplied with cooling water coming from the tower Z x01. Sized so as to maintain the temperature within 50-60° C.

P x01 (stirrer R x01):

Made of Sanicro 28 (or the like), powered by an electric motor. Designed and sized so as to enable suitable contact between the reagents.

G x04 (pump for extracting slurry from R x01):

Horizontally installed centrifugal pump, with a body and impeller made of polypropylene or coated steel. Equipped with a simple mechanical seal.

D x05 (intermediate tank):

Buffer tank, made of coated steel or PP, thermoregulated by E x02 and stirred by P x02. Kept under suction by P x08 and provided with feed and extraction nozzles.

E x02 (cooling coil D x05):

Made of Sanicro 28 (or the like) and supplied with cooling water coming from the tower Z x01. Sized so as to maintain the temperature within 30° C.

P x02 (stirrer P x05):

Made of Sanicro 28 (or the like), powered by an electric motor. Sized so as to enable suitable contact between the reagents (nitrates) and prevent sedimentation of the silica.

Dx03 and Dx04 (storage tank for $Mg(NO_3)_2$ and $Fe(NO_3)_3$ in solution):

Small 1 $m^3$ polyethylene tanks.

G x03: (pump for supplying ammonia to D x05)

G x05 and G x06 (nitrate extraction pumps):

Small metering pumps.

First Filtration Section

G x07 (pump supplying F x01):

Pneumatic diaphragm pump, supplied with instrument air.

F x01 (first filter press):

Automatic filter press, with polypropylene plates and cloths. Provided with drip tray, membrane wringing and blowing, cloth washing and cake washing system. Further equipped with a suction hood connected to P x08.

G x08 (cake washing pump):

Horizontally installed centrifugal pump, with a cast-iron body and impeller, equipped with a simple mechanical seal.

D x06 (evaporator):

Made of coated steel. Kept under suction by P x08 and provided with feed and extraction nozzles. The increase in temperature (up to 130° C.) enables ammonium fluoride to be converted into ammonium bifluoride, which is more reactive toward $CaCO_3$.

E x04 (heating jacket D x06):

Made of carbon steel and supplied with steam. Sized so as to bring the temperature inside D x06 up to about 130° C.

P x03: (stirrer evaporator D x06) Second Reaction Section

G x09 (pump supplying R x02):

Horizontally installed centrifugal pump, with a body and impeller made of coated steel or PP, equipped with a simple mechanical seal.

D x07 (storage silo for carbonate):

Made of carbon steel, equipped with a vent provided with bag filter for dust removal and fan. Fed from tanker trucks via a pneumatic conveyor.

T x01 (rotary valve)

T x02 (screw conveyor for extracting carbonate):

Made of steel, equipped with a balance capable of weighing the carbonate in a stoichiometric amount to the reactor R x02.

R x02 (reactor for the formation of fluorite):

CSTR-type reactor, made of coated steel (ebonite) or PP and stirred by P x04. Kept under suction by P x08 and provided with reagent feed and product extraction nozzles.

P x04 (stirrer reactor R x02):

Made of Sanicro 28 (or the like), powered by an electric motor. Sized so as to enable suitable contact between the reagents and prevent sedimentation of the fluorite.

G x10 (pump from R x02 to D x08):

Horizontally installed centrifugal pump, with a body and impeller made of coated steel or PP, equipped with a simple mechanical seal.

D x08 (intermediate tank):

Buffer tank, made of coated steel or PP, stirred by Px05. Kept under suction by P x08 and provided with feed and extraction nozzles.

P x05 (stirrer D x08):

Made of Sanicro 28 (or the like), powered by an electric motor. Sized so as to prevent sedimentation of the fluorite.

Second Filtration Section

G x11 (pump supplying F x02):

Pneumatic diaphragm pump, supplied with instrument air.

F x02 (second filter press):

Automatic filter press, with polypropylene plates and cloths. Provided with drip tray, membrane wringing and blowing, cloth washing and cake washing system. A hood kept under suction by P x08 should also be provided.

D x09: silo for collecting wet synthetic fluorite

D x13 (intermediate tank):

Made of carbon steel. Kept under suction by P x09 and provided with feed and extraction nozzles. It serves as a buffer for C x01.

P x07: stirrer tank D x13

G x16 (cake washing pump):

Horizontally installed centrifugal pump, with a cast-iron body and impeller, equipped with a simple mechanical seal.

Ammonia Recovery Section

G x13 (pump supplying mother liquors to C x01):

Horizontally installed centrifugal pump, with a cast-iron (steel) body and impeller, equipped with a simple mechanical seal.

C x01 (ammonia stripper):

Made of carbon steel, provided with packing (1 in. metal Raschig rings), overhead and bottom feed nozzles and a system for feeding the mother liquors to the head. Kept under suction by P x09.

E x03 (condenser):

Made of carbon steel, of the horizontal type with condensation on the shell side. Supplied on the tube side with cooling water coming from the water tower Z x01.

D x14 (accumulation tank):

Made of carbon steel or PP, Kept under suction by P x09.

G x14 (pump supplying condensed ammonia to D x02):

Horizontally installed centrifugal pump, with a body and impeller made of polypropylene or coated steel. Equipped with a flushed double mechanical seal.

P x09 (fan):

Axial fan. Head such as to guarantee suction in C x01.

Vent Cleaning Section

P x08 (fan):

Axial fan.

D x12 (storage tank for $H_2SO_4$):

Small 1 $m^3$ polyethylene tanks.

G x12 (pump supplying $H_2SO_4$ to C x02):

Metering pump.

C x02 (wet scrubber):

Made of PP, packing made of plastic material (1 in. Raschig rings), equipped with pH-controlled recirculation tank. System for feeding sour water at the head. Kept under suction by P x08.

Z x01: (cooling tower)

G x15: pump supplying cooling circuit from Z x01

Fluorite Drying Section

B x01 (dryer):

Rotary oven, provided with a burner, fume particle scrubbing section (cyclone), loading hopper, screw conveyors for feeding and extracting fluorite, gear motor for varying the rotation speed and hydraulic pistons for varying the inclination.

T x03 A/B (screw conveyors for feeding wet fluorite to the rotary oven):

carbon steel screw conveyors, equipped with an electric motor, suitable for feeding fluorite to the rotary oven at a constant flow rate.

T x04 (extracting screw conveyor):

carbon steel screw conveyor, for extracting the granular fluorite from the rotary oven and feeding the bucket elevator T x05. Equipped with an electric motor that runs at constant speed.

T x05 (bucket elevator):

steel bucket elevator, provided with an electric motor. It receives the granular fluorite from the screw conveyor T x04 and feeds the storage silo D x10.

T x06 (rotary valve):

steel rotary valve. It regulates the discharge of the fine particles entrained and entrapped in the cyclone D x11 to a storage reservoir below.

P x06 (fan):

axial fan, provided with an electric motor. It delivers the air flow necessary for combustion in the burner of B x01.

D x10 (storage silo for granular fluorite):

steel (or aluminium) silo, suitable for containing the granular product. Fed from a height by the bucket elevator T x05. Provided with a fan and bag filter for venting into the atmosphere.

Dx11 (cyclone):

made of steel, it receives the hot fumes coming out of the rotary oven. It has the purpose of scrubbing and entrapping, by centrifugal force, the fine particles entrained by the turbulence present inside the oven.

1) The ammonia present in the storage tank D x02 is extracted by means of the centrifugal pump G x02 and sent to the batch reactor R x01. Subsequently, the fluorosilicic acid is sent to the reactor by means of the centrifugal pump G x01. The reactor R x01, provided with the stirrer P x01 and cooling coil E x01, enables the hydrolysis of the acid to take place completely, leading to the formation of $NH_4F$ and the precipitation of $SiO_2$ according to reaction A.

$$H_2SiF_6 + 6NH_3 + 2H_2O \rightarrow 6NH_4F + SiO_2 \qquad A)$$

2) The slurry produced in R x01 is extracted by means of the centrifugal pump G x04 and sent to the intermediate tank D x05. The slurry is maintained under stirring with P x02 and is cooled by E x02. In this step, a solution of $Mg(NO_3)_2$ and $Fe(NO_3)_3$ is fed from D x02 and D x04 by the pumps G x05 and G x06, respectively. The pH of the solution can be appropriately adjusted through the addition, by means of the pump G x03, of ammonia from D x02.

3) The slurry is extracted from D x05 by means of the centrifugal pump G x07 and sent to the filter press F x01. Here the silica is retained and the mother liquors are sent to the exchanger/evaporator D x06, consisting of a stirrer P x03 and a heating jacket E x04. In this step, the ammonium fluoride, brought to about 130° C. by a vapour stream, degrades into ammonium bifluoride (more reactive toward calcium carbonate), releasing a mole of $NH_3$ (reaction B). The $SiO_2$ cake is washed with process water, sent by means of the centrifugal pump G x08, in order to recover the fluorine present inside the cake. The washing water is likewise sent to the tank D x06.

$$2NH_4F \rightarrow NH_4HF_2 + NH_3 \qquad B)$$

4) The mother liquors, extracted from D x06, are sent by means of the centrifugal pump G x09 to the continuous reactor R x02 (stirred by P x04). Simultaneously, the weighing screw conveyor T x02 conveys the calcium carbonate extracted from the silo D x07 by means of the rotary valve T x01, in the reactor R x02, where the reaction C takes place:

$$NH_4HF_2 + CaCO_3 \rightarrow CaF_2 \downarrow + CO_2 \uparrow + NH_3 \uparrow \qquad C)$$

5) The slurry produced in R x02 is extracted by means of the centrifugal pump G x10 and sent to the intermediate tank D x08 (stirred by means of P x05).

6) From the intermediate tank the slurry is extracted by means of the centrifugal pump G x11 and sent to the filter press F x02. Here the fluorite is retained and the mother liquors are sent to the buffer tank D x13 stirred by the stirrer P x07. The fluorite cake is washed with process water, by means of the pump G x16, to remove the ammonia present in the cake. The washing water is also sent to D x13. The wet fluorite cake discharged from filter F x02 is conveyed to the storage silo D x09.

7) The mother liquors in D x13 are composed of $NH_3$ in a 10% wt solution. In order to be reused as a reagent in A they must be concentrated to 25% wt. Hence, they are extracted by means of the centrifugal pump G x13 and sent to the stripper C x01, kept under suction by the pump P x09. This apparatus is a packed column, fed overhead with the mother liquors containing the ammonia to be concentrated and at the bottom with a vapour stream at 2 bar, and sized so that the overhead product will be vapours containing 25% $NH_3$, which will then be condensed in E x03 and accumulated in D x14. The bottom product consists of the excess water, which will be sent to the water treatment plant.

The 25% ammonia, condensed at a temperature of just above 30° C., is extracted from D x14 by means of the centrifugal pump G x14 and sent to the storage tank D x02. The cooling water for E x03, as well as for E x01 and E x02, is supplied by the cooling tower Z x01 and delivered into the circuit by means of the pump G x15

8) The apparatus R x01, D x02, D x05, F x01, D x06, R x02, D x08, F x02 and D x13 are kept under suction by the fan P x08, to prevent the dispersion of $NH_3$ vapours into the atmosphere. The vent streams are sent to the bottom of C x02, a wet scrubber fed overhead, by means of the pump G x12, with a solution of $H_2SO_4$, stored in the tank D x12, which has the purpose of entrapping the ammonia present in the stream. The vent streams free of ammonia will thus be emitted into the atmosphere and a solution containing ammonium sulphate formed inside the scrubber will be discharged from the bottom of the column.

9) The wet fluorite outfed from the collecting silo D x09 is conveyed inside the rotary oven B x01 by means of the feed screw conveyor T x03A/B. Drying takes place by direct contact of the hot combustion fumes with the wet fluorite. The rotation and high temperature of the oven promote the formation of dried fluorite granules. The air flow necessary for combustion is supplied by the fan P x06, whilst the fine product entrained by the fumes coming out of the oven B x01 is entrapped by the cyclone D x11 before being sent to the scrubber C x02. The dried fluorite in the form of a fine powder is then discharged from the cyclone D x11 by means of the rotary valve T x06, and can be recovered at the overhead of the drying process. The dried fluorite, in the form of granules, is then unloaded from the oven on the extraction screw conveyor T x04 and conveyed to the bucket elevator T x05 in order to then be stored in the storage silo D x10.

Said embodiments R1 (FIGS. 1 and 5), R2 (FIGS. 2 and 6), R3 (FIGS. 3 and 7) and R4 (FIGS. 4 and 8) comprise an essential drying and granulation step serving to obtain a synthetic fluorite that can be used by existing industrial technology. In fact, as is well known, the fluorite used as a raw material must be fed to HF production lines in the form of a dry powder with an appropriate particle size. In the process of the present invention, the drying step not only enables the water contained in the product to be eliminated, but also produces grains of aggregate material that can be easily managed (transported, stored in silos, dosed and ground) with common, widely disseminated industrial technologies. The drying-granulation step is carried out on a synthetic fluorite slurry, containing 30-50% moisture by weight, output from D x07 or D x09 and directed toward T x03A/B so as to enter into a loading hopper. Using an extraction belt equipped with an inverter it is possible to modulate the load of wet fluorite entering the oven B x01. This load is made to vary so as to have a flow rate of dried slurry and granulate comprised from 180 to 300 kg/h (the motor frequency ranges approximately from 9.34 Hz to 15 Hz). The slurry extracted from the belt goes on to feed a hopper, which in turn feeds the underlying screw conveyor that takes the fluorite into the oven. The screw conveyor has a constant rotation speed.

The burner, equipped with an automatic modulator of the air-fuel ratio, works with a flow rate of LPG such as to have, in the combustion chamber, a temperature comprised from 700° C. to 800° C., for example 784° C. This temperature is sensed by means of a thermocouple connected to a DCS system, as is the adjustment of the fuel flow rate. The adjustment of the fuel flow rate was varied, for example, between 4 and 8 m$^3$/h (flow meter at the burner inlet). The temperature of the fumes coming out of the oven, likewise measured by a thermocouple connected to DCS, shows a value comprised, for example, from 120° C. to 220° C. For example, the inclination of the rotary oven was maintained constant, with the piston at a height of 91 cm above floor level, such as to give the oven an inclination of 1.58°.

The rotation speed of the oven is regulated by means of an electric gear motor equipped with an inverter. In the tests carried out, the inverter varies its frequency, for example, between 9.5 and 30 Hz, such as to enable the oven to rotate with a speed comprised, for example, between 8 and 23 RPM. The dried granulated slurry is extracted from the oven by means of a screw conveyor positioned on the head of the oven. The finished product, synthetic fluorite, is stored and weighed, and the fine particles entrained by the turbulence of the fumes and entrapped in the cyclone (with a high flow rate of finished product, over 300 kg/h, a flow rate of 80-100 kg/h of cyclone product was observed) are likewise stored and weighed. The amounts of granulated and cyclone-treated fluorite, added to the moisture lost during the process, thus make it possible to close the matter-energy balance of the process. The granulated synthetic is then sent to the laboratory for a careful assessment of the characteristics obtained (LOI and particle size distribution).

The table below summarizes the results obtained in several tests:

The process of the present invention, implemented, for example, by said embodiments R1 (FIGS. 1 and 5), R2 (FIGS. 2 and 6), R3 (FIGS. 3 and 7) and R4 (FIGS. 4 and 8) envisages, in order to reduce the concentration of the oxides present in the synthetic fluorite, e.g. MgO or $Al_2O_3$ or $Fe_2O_3$, and/or excess carbonates, e.g. $CaCO_3$ and/or excess calcium hydroxide, implementing the washing steps and subsequent filtration with an aqueous solution of diluted acids such as 5% or 10% HCl or $H_2SO_4$ on the synthetic fluorite output from F x02, prior to the drying step. Reducing MgO, for example, prevents problems during the step of reaction with sulphuric acid. This reaction is conducted in a jacketed rotary oven heated with combustion fumes circulating in the oven jacket. In particular, it is noted that the gypsum produced tends to form scale on the walls of the ovens for the production of HF, thus inhibiting the heat exchange between the hot fumes (external part of the oven) and the reaction mass (internal part of the oven). This effect can cause the reaction to come to a complete halt, producing an undesired plant downtime, or in any case considerably increasing the specific consumption of fluorite (the amount of fluorite lost in the gypsum increases).

The synthetic fluorite according to the present invention obtained, for example, through said embodiments R1 (FIGS. 1 and 5), R2 (FIGS. 2 and 6), R3 (FIGS. 3 and 7) and R4 (FIGS. 4 and 8) has the following physicochemical characteristics that characterize it as new product:
LOI value (measured in accordance with the procedures and the techniques known to the person skilled in the art, in samples from the outlet side of D x08 and D x10) comprised from 0.3 to 1.2, preferably comprised from 0.5 to 0.8, even more preferably from 0.6 to 0.7;

BET value (measured in accordance with the procedures and the techniques known to the person skilled in the art, in samples from the outlet side of D x07 or D x09 after drying at 800° C. in the laboratory) comprised from 20 m$^2$/g to 100 m$^2$/g, preferably comprised from 40 m$^2$/g to 80 m$^2$/g, even more preferably from 50 m$^2$/g to 60 m$^2$/g;

average particle size (measured in accordance with the procedures and the techniques known to the person skilled in the art) as follows in % by weight relative to the weight of the fluorite:

greater than 10 mm, zero;
greater than 5 mm, comprised from 1 to 10, preferably from 1 to 5, even more preferably from 1 to 3;
greater than 1 mm, comprised from 40 to 80, preferably from 50 to 70, even more preferably from 55 to 65;
greater than 0.05 mm, comprised from 10 to 30, preferably from 15 to 25, even more preferably from 20 to 25;
less than 0.05 mm, comprised from 1 to 20, preferably from 5 to 15, even more preferably from 5 to 10.

TABLE 1

|  |  | Average values |
|---|---|---|
| >10 mm | % | 0 |
| >5 mm | % | 2.4 |
| >1 mm | % | 63.9 |
| >0.05 mm | % | 19.2 |
| <0.05 mm | % | 10.9 |
| LOI | % | 0.8 |

The fluorite of the present invention also has:
a concentration of silica $SiO_2$ of less than 1%, preferably less than 0.7%, even more preferably less than 0.35% (measured in accordance with the procedures and the techniques known to the person skilled in the art, in samples calcined at 800° C.);
a value of concentration of MgO less than 0.5%, preferably less than 0.3%, even more preferably less than 0.2% (measured in accordance with the procedures and the techniques known to the person skilled in the art, in samples calcined at 800° C.).

Table 2 shows the composition of a synthetic fluorite obtained in the form of slurry coming out from F x02.
Table 3 shows the main compounds.
Table 4 shows the composition of a synthetic fluorite obtained dried in the form of granules coming out from B x01.
Table 5 shows the main compounds.

TABLE 2

Wet fluorite in the form of slurry

|  | U.M. |  |
|---|---|---|
| $CaF_2$ | % | 96.06 |
| F | % | 46.80 |
| CaO | % | 47.80 |
| $SiO_2$ | % | 0.22 |
| $Na_2O$ | % | 0.11 |
| $SO_3$ | % | 0.02 |
| $Al_2O_3$ | % | 0.12 |
| $P_2O_5$ | % | 0.06 |
| $Fe_2O_3$ | % | 0.04 |
| MgO | % | 0.35 |

TABLE 2-continued

Wet fluorite in the form of slurry

|  | U.M. |  |
|---|---|---|
| $K_2O$ | % | 0.02 |
| $CO_2$ | % | 0.01 |
| $Ca(OH)_2$ | % | 0.20 |
| LOI 800° C. | % | 3.50 |
| Others | % | 0.75 |
| Sum | % | 100.00 |

TABLE 3

|  | U.M. |  |
|---|---|---|
| $CaF_2$ | % | 96.06 |
| $CaSO_4$ | % | 0.03 |
| $SiO_2$ | % | 0.22 |
| $P_2O_5$ | % | 0.06 |
| $CaCO_3$ | % | 0.02 |
| Others | % | 0.10 |
| LOI | % | 3.50 |
| Total | % | 100.00 |

TABLE 5

|  | U.M. |  |
|---|---|---|
| $CaF_2$ | % | 98.42 |
| $CaSO_4$ | % | 0.09 |
| $SiO_2$ | % | 0.26 |
| $P_2O_5$ | % | 0.06 |
| $CaCO_3$ | % | 0.00 |
| Others | % | 0.63 |
| LOI | % | 0.54 |
| Total | % | 100.00 |

TABLE 4

Dried fluorite in the form of granules

|  | U.M. |  |
|---|---|---|
| $CaF_2$ | % | 98.42 |
| F | % | 47.95 |
| CaO | % | 49.80 |
| $SiO_2$ | % | 0.26 |
| $Na_2O$ | % | 0.23 |
| $SO_3$ | % | 0.05 |
| $Al_2O_3$ | % | 0.17 |
| $P_2O_5$ | % | 0.06 |
| $Fe_2O_3$ | % | 0.04 |
| MgO | % | 0.40 |
| $K_2O$ | % | 0.01 |
| $CO_2$ | % | 0.00 |
| $Ca(OH)_2$ | % | 0.00 |
| LOI 800° C. | % | 0.54 |
| Others | % | 0.49 |
| Sum | % | 100.00 |

The invention claimed is:

1. A process for preparing a synthetic fluorite $CaF_2$ comprising the following steps:
(a) preparing a solution of $NH_4F$ by basic hydrolysis at a pH value of from 8.5 to 9.5, by:
(i) reacting an aqueous solution of $H_2SiF_6$ having a concentration of from 15 to 30% by weight with an aqueous solution of $NH_3$ having a concentration of from 10 to 25% by weight to form a reaction solution, wherein the pH of a mixture of the aqueous solution of $H_2SiF_6$ and the aqueous solution of $NH_3$ reaction solution remains stable at about 9 during the addition of the aqueous solution of $NH_3$ and the aqueous solution of $H_2SiF_6$; and (ii) stirring the reaction solution such that the pH of the reaction solution is maintained between a pH of from 8.5 to 9.5, to obtain the solution of $NH_4F$;

(b) filtering precipitated $SiO_2$ from said solution of $NH_4F$ so as to yield an aqueous solution of $NH_4F$;

(c) treating the aqueous solution of $NH_4F$ with calcium hydroxide in an excess amount of from 0.01 to 0.5%, relative to the stoichiometric amount, so as to yield a dispersion which is maintained under stirring for a time of from 10 to 60 minutes at a temperature of from 40 to 90° C.;

(d) filtering the dispersion resulting from step (c) so as to obtain the synthetic fluorite $CaF_2$;

(e) subjecting the result of step (d) to a drying and granulation step so as to yield an acid grade synthetic fluorite $CaF_2$ in the form of granules with an average particle size greater than 1 mm for at least 50% of the same.

2. The process according to claim 1, wherein said solution of $NH_4F$ obtained after step (a) is treated with an amount of iron nitrate (III) comprised from 0.01 g to 0.10 g per 1 g of $SiO_2$ present in said solution of $NH_4F$ and/or with an amount of magnesium nitrate comprised from 0.01 g to 0.10 g per 1 g of $SiO_2$ present in said solution of $NH_4F$, so as to yield a solution of $NH_4F$ containing precipitated silica, and filtering the precipitated silica from the solution of $NH_4F$.

3. A process for preparing a synthetic fluorite $CaF_2$ comprising the following steps:

(a) preparing a solution of $NH_4F$ by basic hydrolysis at a pH value of from 8.5 to 9.5, by:

(i) reacting an aqueous solution of $H_2SiF_6$ having a concentration of from 15 to 30% by weight with an aqueous solution of $NH_3$ having a concentration of from 10 to 25% by weight to form a reaction solution, wherein the pH of a mixture of the aqueous solution of $H_2SiF_6$ and the aqueous solution of $NH_3$ remains stable at about 9 during addition of the aqueous solution of $NH_3$ and the aqueous solution of $H_2SiF_6$; and (ii) stirring the reaction solution such that the pH of the reaction solution is maintained between a pH of from 8.5 to 9.5, to obtain the solution of $NH_4F$;

(b) filtering precipitated $SiO_2$ from said solution of $NH_4F$ so as to yield an aqueous solution of $NH_4F$;

(c) treating the aqueous solution of $NH_4F$ with calcium carbonate in an excess amount of from 0.01 to 0.5%, relative to the stoichiometric amount, so as to yield a dispersion which is maintained under stirring for a time of from 10 to 60 minutes at a temperature of from 60 to 90° C.;

(d) filtering or vacuum filtering the dispersion resulting from step (c) so as to obtain the synthetic fluorite $CaF_2$;

(e) subjecting the result of step (d) to a drying and granulation step so as to yield an acid grade synthetic fluorite $CaF_2$ in the form of granules with an average particle size greater than 1 mm for at least 50% of the same.

4. The process according to claim 3, wherein the calcium carbonate has an average particle size distribution comprised from 50 to 400 microns, and wherein ammonia produced in step (c) is recovered at a temperature of about 60-70° C. and always under slight negative pressure.

5. A process for preparing a synthetic fluorite $CaF_2$ comprising the following steps:

(a) preparing a solution of $NH_4F$ by basic hydrolysis at a pH value of from 8.5 to 9.5, by:

(i) reacting an aqueous solution of $H_2SiF_6$ having a concentration of from 15 to 30% by weight with an aqueous solution of $NH_3$ having a concentration of from 10 to 25% by weight to form a reaction solution, wherein the pH of a mixture of the aqueous solution of $H_2SiF_6$ and the aqueous solution of $NH_3$ remains stable at about 9 during addition of the aqueous solution of $NH_3$ and the aqueous solution of $H_2SiF_6$; and (ii) stirring the reaction solution such that the pH of the reaction solution is maintained between a pH of from 8.5 to 9.5, to obtain the solution of $NH_4F$;

(b) filtering precipitated $SiO_2$ from said solution of $NH_4F$ so as to yield an aqueous solution of $NH_4F$;

(c) distilling under reduced pressure the aqueous solution of $NH_4F$ obtained from step (b) so as to transform the $NH_4F$ into $NH_4HF_2$ according to the following reaction:

$$2NH_4F_{(aq)} \rightarrow NH_4HF_{2(aq)} + NH_{3(gas)};$$

(d) treating the aqueous solution of $NH_4HF_2$ resulting from step (c) with (A) calcium carbonate so as to yield a dispersion containing the synthetic fluorite $CaF_2$, according to the following reaction:

$$NH_4HF_{2(aq)} + CaCO_{3(solid)} \rightarrow CaF_{2(solid)} + CO_{2(gas)} + NH_{3(gas)};\ or\ with$$

(B) calcium hydroxide so as to yield a dispersion containing the synthetic fluorite $CaF_2$, according to the following reaction:

$$NH_4HF_{2(aq)} + Ca(OH)_{2(solid)} \rightarrow CaF_{2(solid)} + 2H_2O_{(aq)} + NH_{3(gas)};$$

(e) filtering or vacuum filtering the dispersion resulting from step (d) so as to obtain the synthetic fluorite $CaF_2$;

(f) subjecting the result of step (e) to a drying and granulation step so as to yield an acid grade synthetic fluorite $CaF_2$ in the form of granules with an average particle size greater than 1 mm for at least 50% of the same.

6. The process according to claim 3, wherein the calcium carbonate has a moisture content of less than 10% by weight, a $CaCO_3$ concentration greater than 97%, and a content of inorganic contaminants selected from among $SiO_2$, $MgCO_3$, metal oxides and metals.

7. The process according to claim 1, wherein in step (a) the solution of $NH_4F$ is prepared in 3-5 hours.

8. The process according to claim 5, wherein distilling in step (c) is conducted at 130° C.

9. The process according to claim 3, wherein in step (a) the solution of $NH_4F$ is prepared in 3-5 hours.

10. The process according to claim 5, wherein in step (a) the solution of $NH_4F$ is prepared in 3-5 hours.

11. The process according to claim 1, wherein in step (a) the temperature of the reaction solution is maintained between 50° C. and 70° C.

12. The process according to claim 3, wherein in step (a) the temperature of the reaction solution is maintained between 50° C. and 70° C.

13. The process according to claim 5, wherein in step (a) the temperature of the reaction solution is maintained between 50° C. and 70° C.

14. The process according to claim 1, wherein the $NH_3$ is dosed in a stoichiometric excess of about 20-30% by weight of $H_2SiF_6$ relative to a value of 6 moles of $NH_3$ per mole of $H_2SiF_6$.

15. The process according to claim 3, wherein the $NH_3$ is dosed in a stoichiometric excess of about 20-30% by weight of $H_2SiF_6$ relative to a value of 6 moles of $NH_3$ per mole of $H_2SiF_6$.

16. The process according to claim 5, wherein the $NH_3$ is dosed in a stoichiometric excess of about 20-30% by weight of $H_2SiF_6$ relative to a value of 6 moles of $NH_3$ per mole of $H_2SiF_6$.

* * * * *